United States Patent
Pio et al.

(10) Patent No.: US 10,657,702 B2
(45) Date of Patent: May 19, 2020

(54) SYSTEMS AND METHODS FOR CONTENT STREAMING

(71) Applicant: Facebook, Inc., Menlo Park, CA (US)

(72) Inventors: David Young Joon Pio, Santa Clara, CA (US); Evgeny V. Kuzyakov, San Jose, CA (US); Chien-Nan Chen, Champaign, IL (US)

(73) Assignee: Facebook, Inc., Menlo Park, CA (US)

( * ) Notice: Subject to any disclaimer, the term of this patent is extended or adjusted under 35 U.S.C. 154(b) by 41 days.

(21) Appl. No.: 15/847,184

(22) Filed: Dec. 19, 2017

(65) Prior Publication Data

US 2018/0108171 A1    Apr. 19, 2018

Related U.S. Application Data

(63) Continuation of application No. 15/271,081, filed on Sep. 20, 2016, now Pat. No. 9,858,706.

(Continued)

(51) Int. Cl.
*G06T 15/20* (2011.01)
*G06F 3/01* (2006.01)
(Continued)

(52) U.S. Cl.
CPC .............. *G06T 15/20* (2013.01); *G06F 3/011* (2013.01); *G06T 3/005* (2013.01);
(Continued)

(58) Field of Classification Search
CPC ....... H04N 21/44218; H04N 21/44222; H04N 19/103; H04N 19/105
See application file for complete search history.

(56) References Cited

U.S. PATENT DOCUMENTS

| | | |
|---|---|---|
| 4,692,806 A | 9/1987 | Anderson |
| 5,754,182 A | 5/1998 | Kobayashi |

(Continued)

FOREIGN PATENT DOCUMENTS

| | | |
|---|---|---|
| EP | 2627076 | 8/2013 |
| KR | 10-2011-0068764 | 6/2011 |
| WO | 2008060933 | 5/2008 |

OTHER PUBLICATIONS

International Application No. PCT/US2016/052797, International Search Report and Written Opinion dated Jan. 3, 2017.

(Continued)

*Primary Examiner* — Pankaj Kumar
*Assistant Examiner* — Timothy R Newlin
(74) *Attorney, Agent, or Firm* — Sheppard Mullin Richter & Hampton LLP

(57) ABSTRACT

Systems, methods, and non-transitory computer-readable media can obtain a spherical media content item that captures at least one scene from a plurality of different positions. A three-dimensional shape having a plurality of faces is determined, each face being associated with a respective set of original boundaries. A respective set of expanded boundaries for one or more of the plurality of faces is determined. Respective portions of the spherical media content item are mapped to each of the one or more faces, wherein a first portion of the spherical media content item is mapped to a first face having a set of expanded boundaries.

19 Claims, 26 Drawing Sheets

Related U.S. Application Data

(60) Provisional application No. 62/222,154, filed on Sep. 22, 2015.

(51) Int. Cl.
*G06T 3/00* (2006.01)
*H04N 21/81* (2011.01)
*H04N 21/61* (2011.01)

(52) U.S. Cl.
CPC ...... *G06T 2200/04* (2013.01); *H04N 21/6125* (2013.01); *H04N 21/816* (2013.01)

(56) References Cited

U.S. PATENT DOCUMENTS

| | | | |
|---|---|---|---|
| 6,141,034 | A | 10/2000 | McCutchen |
| 6,417,867 | B1 | 7/2002 | Hallberg |
| 6,515,673 | B1 | 2/2003 | Hashimoto |
| 6,567,086 | B1 | 5/2003 | Hashimoto |
| 7,015,954 | B1 | 3/2006 | Foote |
| 8,154,586 | B2 | 4/2012 | Li |
| 8,553,028 | B1 | 10/2013 | Urbach |
| 2002/0140702 | A1 | 10/2002 | Koller |
| 2002/0141650 | A1 | 10/2002 | Keeney |
| 2003/0011714 | A1 | 1/2003 | Nevins |
| 2003/0067476 | A1* | 4/2003 | Miller ............... G06F 3/011 345/598 |
| 2003/0101449 | A1* | 5/2003 | Bentolila ........... G06Q 30/0251 725/10 |
| 2005/0273830 | A1* | 12/2005 | Silver ................ H04N 5/4401 725/105 |
| 2006/0256113 | A1 | 11/2006 | Grover |
| 2007/0035562 | A1* | 2/2007 | Azuma ............... G03B 13/28 345/633 |
| 2007/0182812 | A1* | 8/2007 | Ritchey ............... H04N 5/2254 348/36 |
| 2010/0001997 | A1 | 1/2010 | Kajikawa |
| 2010/0277468 | A1 | 11/2010 | Lefevre |
| 2011/0115909 | A1* | 5/2011 | Sternberg ............ G01S 3/7864 348/143 |
| 2012/0105601 | A1 | 5/2012 | Jeon |
| 2013/0044108 | A1 | 2/2013 | Tanaka |
| 2013/0185353 | A1 | 7/2013 | Rondao Alface |
| 2013/0249947 | A1 | 9/2013 | Reitan |
| 2014/0132598 | A1 | 5/2014 | Narukawa |
| 2014/0152655 | A1 | 6/2014 | Johnston |
| 2014/0168362 | A1* | 6/2014 | Hannuksela ......... H04N 13/161 348/43 |
| 2015/0186774 | A1* | 7/2015 | Albouyeh ............. H04L 67/22 706/46 |
| 2015/0195573 | A1* | 7/2015 | Aflaki Beni ......... H04N 19/597 375/240.16 |
| 2015/0249512 | A1* | 9/2015 | Adimatyam .......... H04H 20/12 725/107 |
| 2015/0249815 | A1 | 9/2015 | Sandrew |
| 2015/0338915 | A1* | 11/2015 | Publicover ........... G06K 9/0061 345/633 |
| 2016/0012855 | A1* | 1/2016 | Krishnan ............. G11B 27/105 386/241 |
| 2016/0165259 | A1* | 6/2016 | Nam .................... H04N 19/533 375/240.08 |
| 2016/0352791 | A1* | 12/2016 | Adams ................ H04L 65/4069 |
| 2018/0108171 | A1* | 4/2018 | Pio ....................... G06T 15/20 |

OTHER PUBLICATIONS

European Patent Application No. 16189954.7, Search Report dated Feb. 15, 2017.

* cited by examiner

520

522

| Right 524 | Left 526 | Top 528 |
|---|---|---|
| Bottom 530 | Front 532 | Back 534 |

```
┌─────────────────────────────────────────────────────────────┐
│  Determine at least one content item to be presented, the   │
│  content item being composed using a set of content streams │
│  that capture at least one scene from a plurality of        │
│  different positions                                        │
│                          702                                │
└─────────────────────────────────────────────────────────────┘
                              │
                              ▼
┌─────────────────────────────────────────────────────────────┐
│  Determine a viewport interface for presenting the content  │
│  item, wherein the viewport interface is associated with a  │
│  viewport shape                                             │
│                          704                                │
└─────────────────────────────────────────────────────────────┘
                              │
                              ▼
┌─────────────────────────────────────────────────────────────┐
│  Provide the viewport interface through a display, wherein  │
│  at least one content stream is presented through the       │
│  viewport interface, and wherein a portion of the content   │
│  stream that corresponds to a region inside of the          │
│  viewport shape is presented at a first content quality     │
│                          706                                │
└─────────────────────────────────────────────────────────────┘
```

FIGURE 7

SYSTEMS AND METHODS FOR CONTENT STREAMING

CROSS-REFERENCE TO RELATED APPLICATIONS

This application is a continuation of U.S. patent application Ser. No. 15/271,081, filed on Sep. 20, 2016, and entitled "SYSTEMS AND METHODS FOR CONTENT STREAMING", which claims priority to U.S. Provisional Patent Application No. 62/222,154, filed on Sep. 22, 2015 and entitled "SYSTEMS AND METHODS FOR CONTENT STREAMING", which are all incorporated herein by reference.

FIELD OF THE INVENTION

The present technology relates to the field of content streaming. More particularly, the present technology relates to techniques for encoding and streaming spherical or three-dimensional (3D) content.

SUMMARY

Various embodiments of the present disclosure can include systems, methods, and non-transitory computer readable media configured to determine at least one content item to be presented, the content item being composed using a set of content streams that capture at least one scene from a plurality of different positions. A viewport interface for presenting the content item is determined, wherein the viewport interface is associated with a viewport shape. The viewport interface is provided through a display, wherein at least one content stream is presented through the viewport interface, and wherein a portion of the content stream that corresponds to a region inside of the viewport shape is presented at a first content quality.

In some embodiments, another portion of the content stream that corresponds to a region outside of the viewport shape is presented at a second content quality that is lower than the first content quality.

In some embodiments, the systems, methods, and non-transitory computer readable media are configured to obtain information describing a viewing pattern of a user accessing the content item, the viewing pattern determined based at least in part on one or more other content items that were accessed by the user and determine the viewport shape based at least in part on the viewing pattern.

In some embodiments, the viewing pattern corresponds to changes in the direction of the viewport interface during playback of at least a portion of the content item.

In some embodiments, the systems, methods, and non-transitory computer readable media are configured to obtain information describing an aggregated viewing pattern of a plurality of users that accessed the content item and determine the viewport shape based at least in part on the aggregated viewing pattern.

In some embodiments, the systems, methods, and non-transitory computer readable media are configured to determine that the viewport shape reduces a rate at which content streams are switched during playback of the content item.

In some embodiments, the viewport shape corresponds to one of a diamond shape, an oval shape, a rectangular shape, or another polygonal shape.

In some embodiments, the set of content streams collectively capture a 360-degree view of the scene.

In some embodiments, the at least one content stream being presented through the viewport interface is selected based at least in part on a direction of the viewport interface relative to the scene.

In some embodiments, the systems, methods, and non-transitory computer readable media are configured to determine a change in the direction of the viewport interface, determine that the changed direction corresponds to a different portion of the scene that was captured in a second content stream, and provide the second content stream through the viewport interface.

Various embodiments of the present disclosure can include systems, methods, and non-transitory computer readable media configured to obtain a spherical media content item that captures at least one scene from a plurality of different positions. A three-dimensional object having a plurality of faces is determined, each face being associated with a respective set of original boundaries. A respective set of expanded boundaries for one or more of the plurality of faces is determined. Respective portions of the spherical media content item are mapped to each of the one or more faces, wherein a first portion of the spherical media content item is mapped to a first face having a set of expanded boundaries.

In some embodiments, the expanded boundaries corresponding to the first face are determined based at least in part on an adjusted mapping angle.

In some embodiments, the systems, methods, and non-transitory computer readable media are configured to determine a mapping angle for projecting the first portion of the spherical media content item to the first face of the three-dimensional object based at least in part on a set of original boundaries corresponding to the first face and adjust the mapping angle, wherein the first portion of the spherical media content item is projected onto the first face at the adjusted mapping angle.

In some embodiments, the adjusted mapping angle is greater than the mapping angle.

In some embodiments, the systems, methods, and non-transitory computer readable media are configured to cause a second portion of the spherical media content item to be projected to a second face of the three-dimensional object, the second face having a set of expanded boundaries, wherein the second face is adjacent to the first face, and wherein the projected first portion and the projected second portion overlap at least partially.

In some embodiments, the three-dimensional object is a cube, and wherein a respective portion of the spherical media content item is mapped to each face of the cube.

In some embodiments, a top view portion of the spherical media content item is mapped to a top view square in the cube, a left view portion of the spherical media content item is mapped to a left view square in the cube, a right view portion of the spherical media content item is mapped to a right view square in the cube, a front view portion of the spherical media content item is mapped to a front view square in the cube, a back view portion of the spherical media content item is mapped to a back view square in the cube, and a bottom view portion of the spherical media content item is mapped to a bottom view square in the cube.

In some embodiments, the systems, methods, and non-transitory computer readable media are configured to apply an image obscuring process to at least a portion of the first face.

In some embodiments, the systems, methods, and non-transitory computer readable media are configured to apply a low-pass filter to the portion of the first face.

In some embodiments, the systems, methods, and non-transitory computer readable media are configured to apply a blur to the portion of the first face.

Various embodiments of the present disclosure can include systems, methods, and non-transitory computer readable media configured to obtain a spherical media content item that captures at least one scene from a plurality of different positions. A three-dimensional object with a plurality of faces that converge at a point is determined. At least a first portion of the spherical media content item is mapped to at least a first face in the plurality of faces.

In some embodiments, the systems, methods, and non-transitory computer readable media are configured to cause the first portion of the spherical media content item to be projected onto the first face.

In some embodiments, the first portion corresponds to a first view of the scene, and wherein the first face corresponds to a base region of the three-dimensional object.

In some embodiments, the systems, methods, and non-transitory computer readable media are configured to project a second portion of the spherical media content item onto a second face in the plurality of faces, wherein the second face corresponds to a side region of the three-dimensional object.

In some embodiments, the first portion being projected onto the first face has a higher graphical quality than the second portion being projected onto the second face.

In some embodiments, a graphical quality at which the second portion is being projected onto the second face becomes progressively lower as the second face converges at the point.

In some embodiments, the three-dimensional object includes a base to which the plurality of faces are connected, and wherein the plurality of faces converge at an apex.

In some embodiments, the three-dimensional object is a pyramid, and wherein the base corresponds to a diamond shape.

In some embodiments, the three-dimensional object is a cone, and wherein the base corresponds to an oval shape.

In some embodiments, the three-dimensional object corresponds to a teardrop shape.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5B illustrates an example scenario associated with utilizing polygonal media mapping, according to an embodiment of the present disclosure.

FIG. 7 illustrates an example method for presenting content, according to an embodiment of the present disclosure.

Figure 1A:
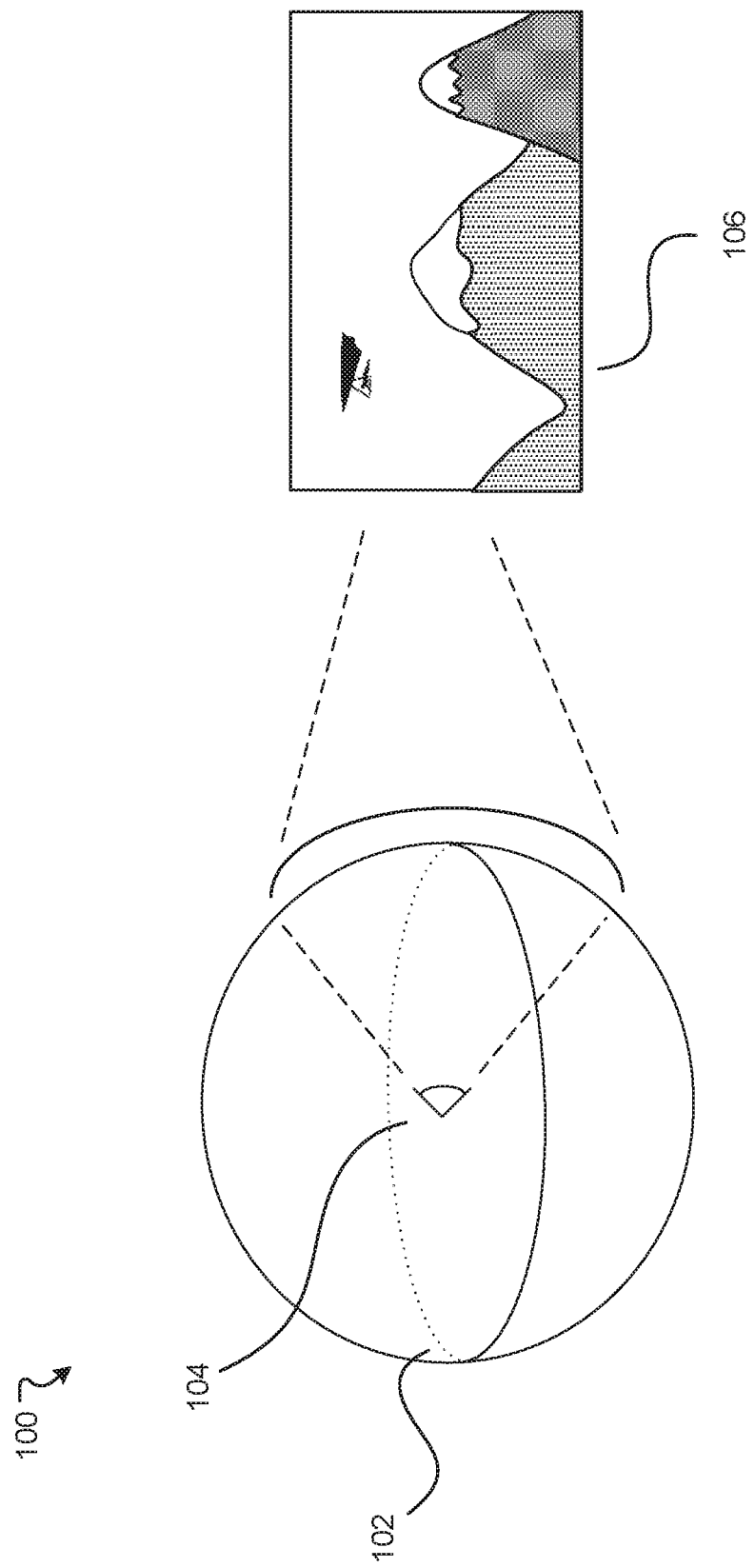
FIGS. 1A-E illustrate examples of streaming a spherical video, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Content Streaming

People use computing systems (or devices) for various purposes. Users can utilize their computing systems to establish connections, engage in communications, interact with one another, and/or interact with various types of content. In some cases, computing devices can be configured to provide spherical media content, such as spherical videos. For example, a virtual reality (VR) computing device can be configured to display spherical media content. When a user of the virtual reality computing device (e.g., headset, glasses, etc.) turns his or her head, the user's view, or the displayed area, of the spherical media content item can be adjusted accordingly. In another example, a mobile or wearable computing device, such as a smartphone, a tablet, or a smart watch, can be configured to display spherical media content. Movements or changes in position to the mobile or wearable computing device can cause the displayed portion of the spherical media content to be modified as well. In a further example, a desktop computing device can display spherical media content. Based on commands or interactions via the desktop computing device's input mechanisms (e.g., mouse, keyboard), the displayed or viewable portion of the spherical media content can too be changed accordingly.

In some cases, conventional approaches rooted in computer technology for media processing can, for data efficiency purposes, attempt to map a spherical media content item (e.g., a spherical image, a spherical video, etc.) onto a rectangle, such as via an equirectangular projection technique. However, equirectangular projection can result in the spherical media content item being undesirably distorted in representation when mapped onto the rectangle. Moreover, in some instances, conventional approaches rooted in computer technology for media processing can attempt to map the spherical media content item onto a three dimensional cube, such as via a cube mapping technique. Corresponding portions of the spherical media content item can, for instance, be mapped onto six faces (e.g., inner surfaces) of the cube. However, in accordance with such conventional approaches, when the six faces are connected together to form a cubical representation of the spherical media content item, there can be undesirable visible seams and/or distortions where the edges of the six faces are connected.

Due to these or other concerns, conventional approaches can be disadvantageous or problematic. Therefore, an improved approach can be beneficial for addressing or alleviating various drawbacks associated with conventional approaches. In one example, the disclosed technology can utilize polygonal edge expansion for spherical media mapping. Various embodiments of the present disclosure can acquire (i.e., retrieve, receive, identify, select, access, etc.) a spherical media content item. A three dimensional geometrical object including a plurality of polygonal faces can be selected (i.e., defined, preset, identified, etc.). A respective set of edges, included with each polygonal face in the plurality of polygonal faces, can be expanded outward to produce a respective set of expanded edges included with each polygonal face. A respective portion of the spherical media content item can be mapped to each polygonal face including the respective set of expanded edges. At least a first polygonal face including a first set of expanded edges can be connectable to at least a second polygonal face including a second set of expanded edges to produce at least a portion of a representation of the spherical media content item. Other improved approaches for overcoming drawbacks that typically arise in conventional approaches are also described herein.

FIGS. 1A-E illustrate examples of streaming a spherical video, according to an embodiment of the present disclosure. FIG. 1A illustrates an example 100 of a viewport 104 displaying a portion of a video stream 106 of a spherical video. The viewport 104 is shown in the diagram of FIG. 1A as being positioned within a representation 102 of a spherical video to facilitate understanding of the various embodiments described herein. In some embodiments, a spherical video captures a 360-degree view of a three-dimensional scene. The spherical video can be created by a single camera or by stitching together various video streams, or feeds, that were captured by cameras positioned at different locations and/or positions to capture a 360 degree view of the scene.

Figure 1B:
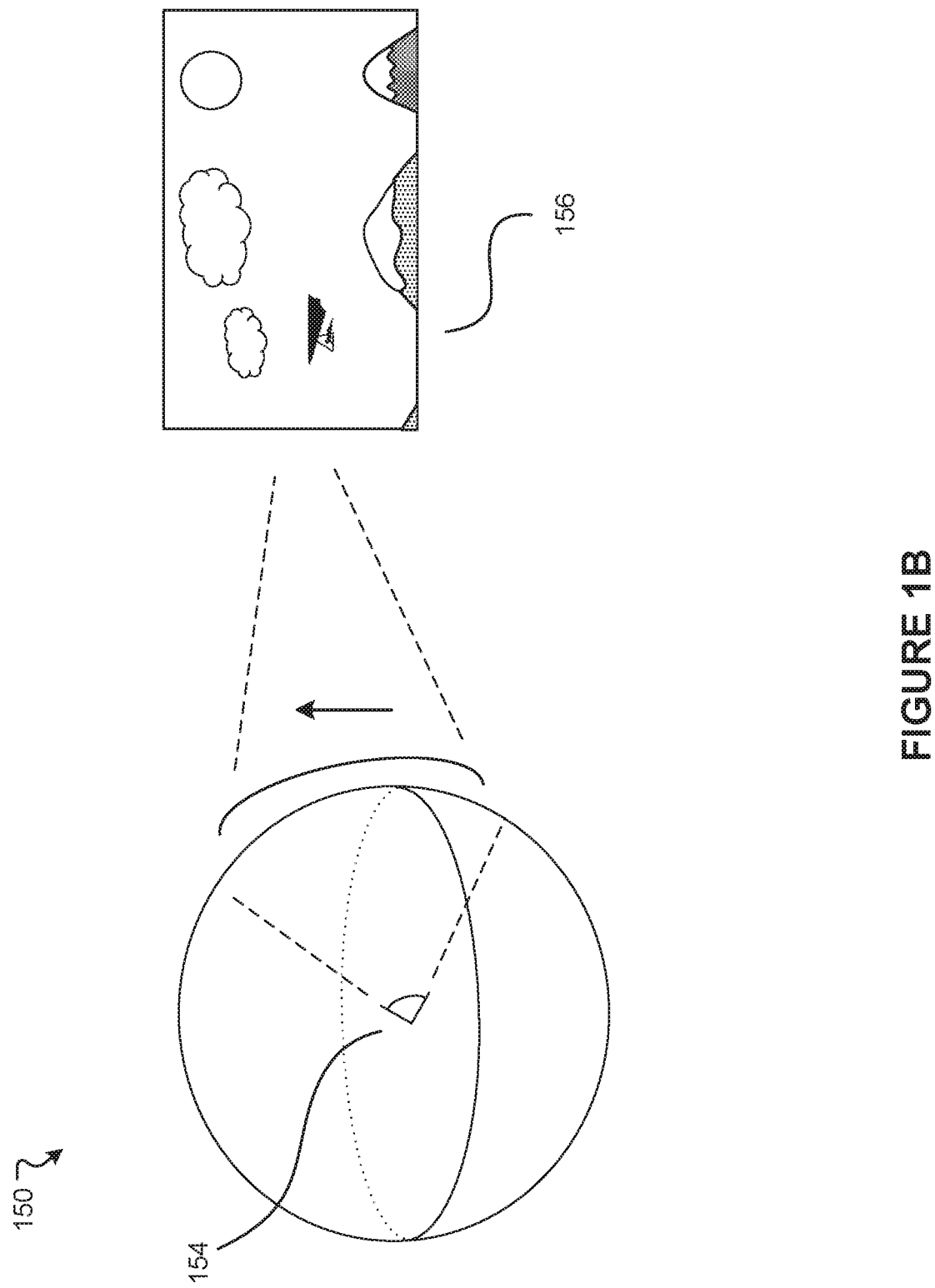

Once stitched together, a user can access, or playback, the spherical video through a viewport 104 to view a portion of the spherical video at some angle. The viewport 104 may be viewed through video player software on a desktop computer, a laptop computer, a mobile device such as a mobile phone or tablet, and/or a virtual reality system or a head mounted display, for example. The stitched spherical video can be projected as a sphere, as illustrated by the representation 102. Generally, while accessing the spherical video, the user can change the direction (e.g., pitch, yaw, roll) of the viewport 104 to access another portion of the scene captured by the spherical video. FIG. 1B illustrates an example 150 in which the direction of the viewport 154 has changed in an upward motion (e.g., as compared to viewport 104) and, as a result, the video stream 156 of the spherical video being accessed through the viewport 154 has been updated (e.g., as compared to video stream 106) to show the portion of the spherical video that corresponds to the updated viewport direction.

The direction of the viewport 104 may be changed in various ways depending on the implementation. For example, while accessing the spherical video through a video player running on a computing device, the user may change the direction of the viewport 104 using a mouse or similar device or through a gesture recognized by the computing device. As the direction changes, the viewport 104 can be provided a stream corresponding to that direction, for example, from a content provider system which may, for example, be remotely hosted on one or more servers. In another example, while accessing the spherical video through a display screen of a mobile device, the user may change the direction of the viewport 104 by changing the direction (e.g., pitch, yaw, roll) of the mobile device as determined, for example, using gyroscopes, accelerometers, touch sensors, and/or inertial measurement units in the mobile device. Further, if accessing the spherical video through a virtual reality head mounted display, the user may change the direction of the viewport 104 by changing the direction of the user's head (e.g., pitch, yaw, roll). Naturally, other approaches may be utilized for navigating playback of a spherical video including, for example, touch screen or other suitable gestures.

As mentioned, the spherical video for the scene can be created by stitching together camera feeds taken of the scene at various positions. When changing the direction of the viewport 104, the viewport 104 can be provided a stream of the spherical video that may be composed of one or more camera feeds taken of the scene. Such streams may be pre-determined for various angles (e.g., 0 degree, 30 degrees, 60 degrees, etc.) of the spherical video and the viewport may be provided the appropriate stream based on its direction (e.g., taking into account one or both of angle and position within the full 360-degree scene).

In some embodiments, the stream(s) being provided, for example, by a content provider system, is provided in real-time based on the determined direction of the viewport 104. For example, when the direction of the viewport 104 changes to a new position, the computing device through which the viewport 104 is being accessed and/or the content provider system can determine the new position of the viewport 104 and the content provider system can send, to the computing device, stream data corresponding to the new position. Thus, in such embodiments, each change in the viewport 104 position is monitored, in real-time (e.g., constantly or at specified time intervals) and information associated with the change is provided to the content provider system such that the content provider system may send the appropriate stream that corresponds to the change in direction.

Figure 1C:
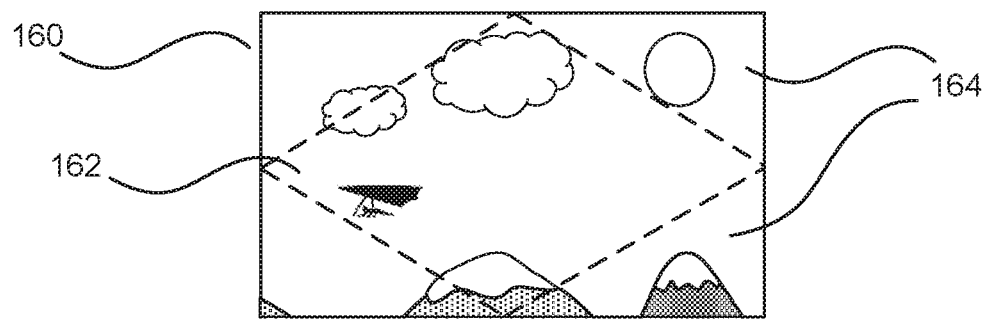
Figure 1D:
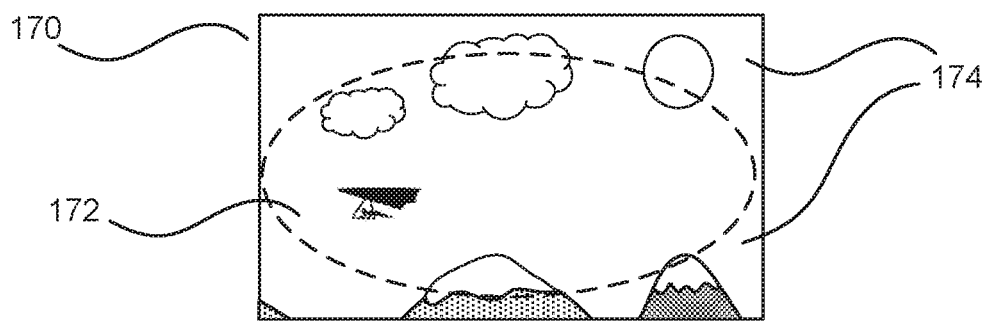
Figure 1E:
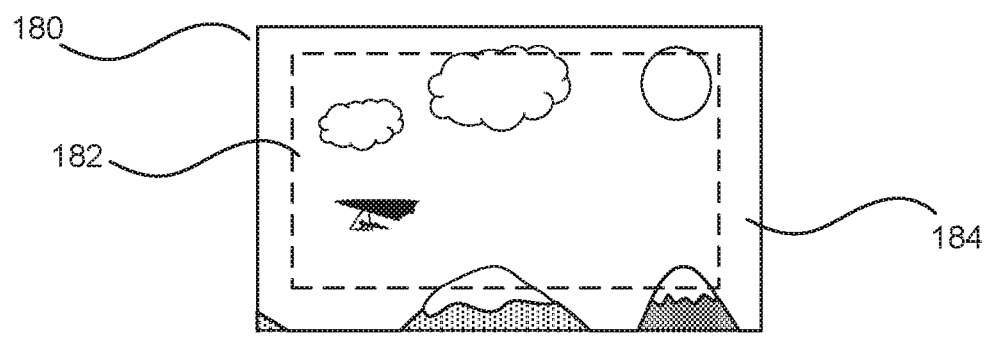

In some embodiments, the stream (e.g., data, bits, etc.) being provided can be adjusted based on, or in part on, a viewport shape, as illustrated in FIGS. 1C-E. In some embodiments, a viewport for a spherical video is determined based on the direction (e.g., angle) of the spherical video that is being viewed and the shape being utilized for the viewport. For example, the viewport can be associated with a shape that reflects a general viewing pattern of a scene captured by a spherical video. In various embodiments, the video content (e.g., pixels) within the viewport shape boundary can be streamed at a higher encoding, or bit rate, so that users can see higher quality content in the areas of the scene that correspond to the general viewing pattern while providing lower quality content in the areas of the scene that users generally do not view. In various embodiments, viewport shapes may be customized for specific users and/or spherical videos. Further, different viewport shapes may be utilized for different portions of a given spherical video. Such viewport shapes may be determined, for example, by analyzing the viewing patterns of individual users and/or by analyzing, in the aggregate, user viewing patterns for various spherical videos. When analyzing viewing patterns, a computing system can analyze the changes made to the direction of the viewport by users over some period of time or throughout playback of a spherical video. Such changes may be the result of the user changing the direction of the viewport by using a mouse or a gesture, by changing the orientation of a mobile device, or changing the orientation of a virtual reality head mounted display (e.g., changes to pitch, yaw, roll as determined by head tracking information). In some embodiments, the viewport shape may be determined based, in part, on a cost function for utilizing different viewport shapes for each time interval (e.g., one second). For example, a cost function may be based on utilizing a viewport shape that reduces the rate at which streams are switched during playback of the spherical video. In one example, if the viewport shape causes the streams to switch often, for example, due to the viewport shape being too small, then more data may need to be downloaded to facilitate continued playback of the video. This can result in a sub-optimal viewing experience for the user.

FIG. 1C illustrates an example scene 160 for which it may be determined that users that view the scene 160 generally exhibit a vertical and horizontal viewing pattern without viewing the corners of the scene. In this example, based on user behavior, a diamond viewport shape 162 may be utilized so that video content that is within the viewport shape boundary 162 can be streamed at a higher quality (e.g., bit rate) while video content outside 164 of the viewport shape 162 can be streamed at a lower quality (e.g., bit rate).

FIG. 1D illustrates an example scene 170 for which an oval shaped viewport shape 172 is being utilized. For example, an oval shaped viewport shape 172 may be utilized when it is determined that users viewing the spherical video generally change the position of the viewport left to right (e.g., more than changing the position vertically). In this example, video content for the scene 170 can be streamed at a higher quality (e.g., bit rate) inside the viewport 172 while video content outside 174 of the viewport shape 172 can be streamed at a lower quality.

FIG. 1E illustrates an example scene 180 for which a rectangular shaped viewport shape 182 is being utilized. In this example, video content for the scene 180 can be streamed at a higher quality (e.g., bit rate) inside the viewport 182 while video content outside 184 of the viewport shape 182 can be streamed at a lower quality.

FIGS. 2A-D illustrate examples of generating new streams of a spherical video based on user behavior, according to an embodiment of the present disclosure. As mentioned, a spherical video for a scene can be created by stitching together camera feeds taken of the scene at various positions. When accessing the spherical video through a viewport, the viewport can be provided a stream that corresponds to the direction (including, e.g., angle or position) of the viewport in the spherical video. The stream provided may be composed of one or more of the camera feeds taken of the scene. Such streams may be pre-determined for various angles (e.g., 0 degree, 30 degrees, 60 degrees, etc.) of the spherical video and the viewport may be provided the appropriate stream based on its direction.

Figure 2A:
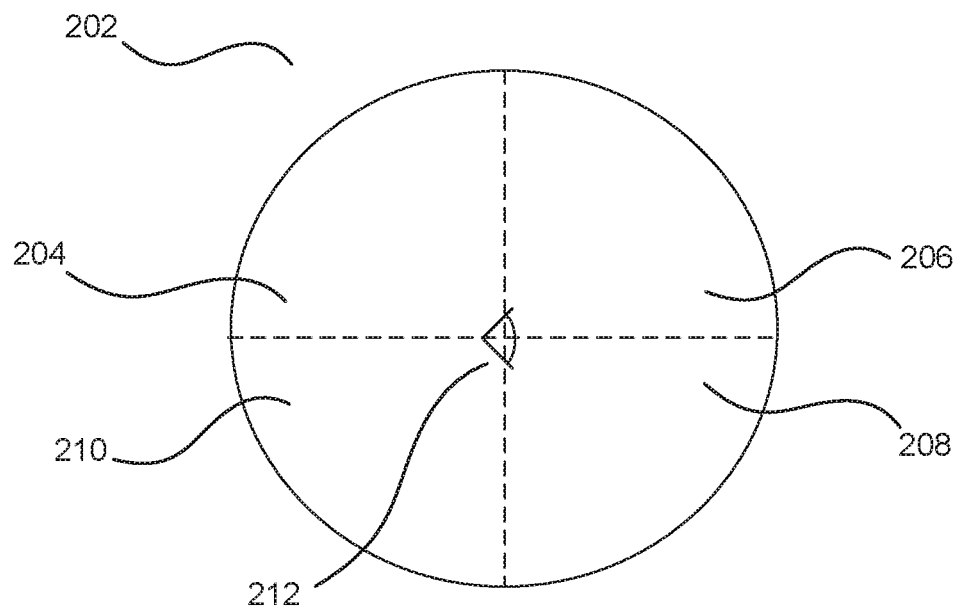
FIGS. 2A-D illustrate examples of generating new streams of a spherical video based on user behavior, according to an embodiment of the present disclosure.
Figure 2B:
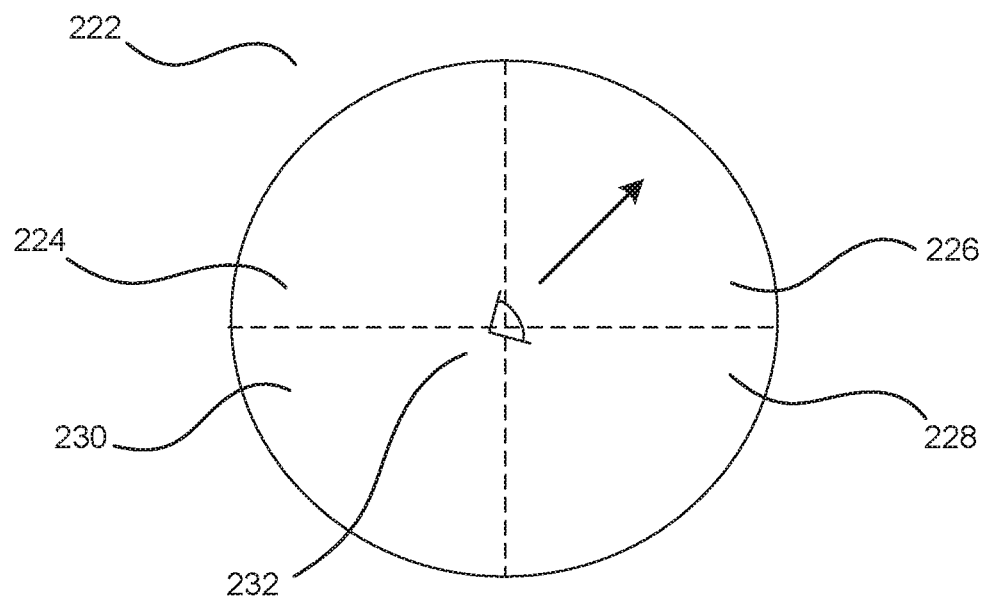

FIG. 2A illustrates an example diagram 202 of a spherical video. The diagram 202 is provided in two-dimensional form to facilitate understanding of the various embodiments described herein. As shown in FIG. 2A, the example spherical video is composed of the streams 204, 206, 208, and 210. A content provider system can determine which stream to send to a computing device based on the direction of the viewport 212 associated with the computing device. In one example, as illustrated in FIG. 2B, the viewport 232 is facing a direction that corresponds to the direction associated with the stream 226. In this example, the content provider system can send data corresponding to the stream 226 to be presented through the viewport 232. The number of streams illustrated serve merely as examples and any number of streams may be utilized for a given spherical video.

Figure 2C:
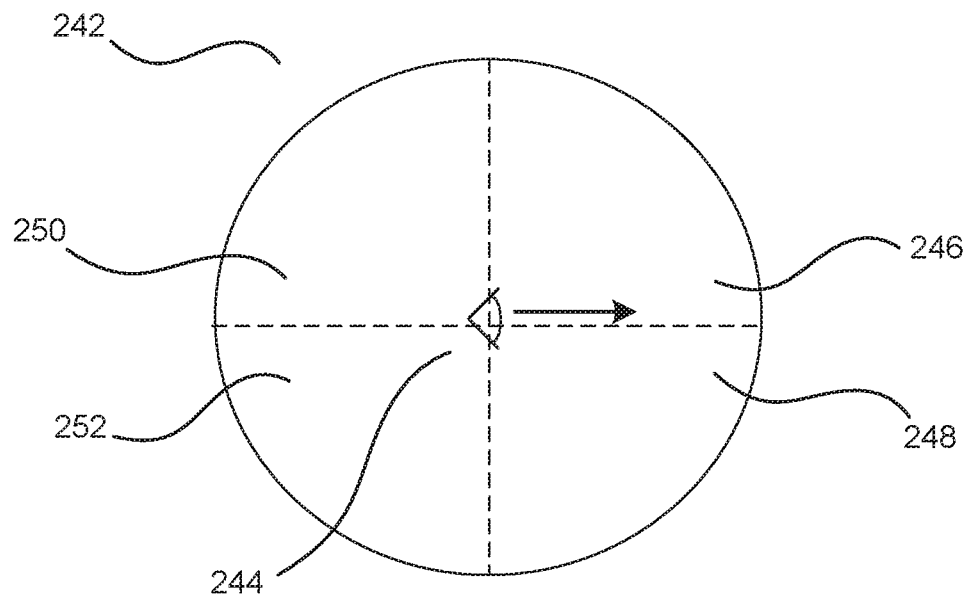
Figure 2D:
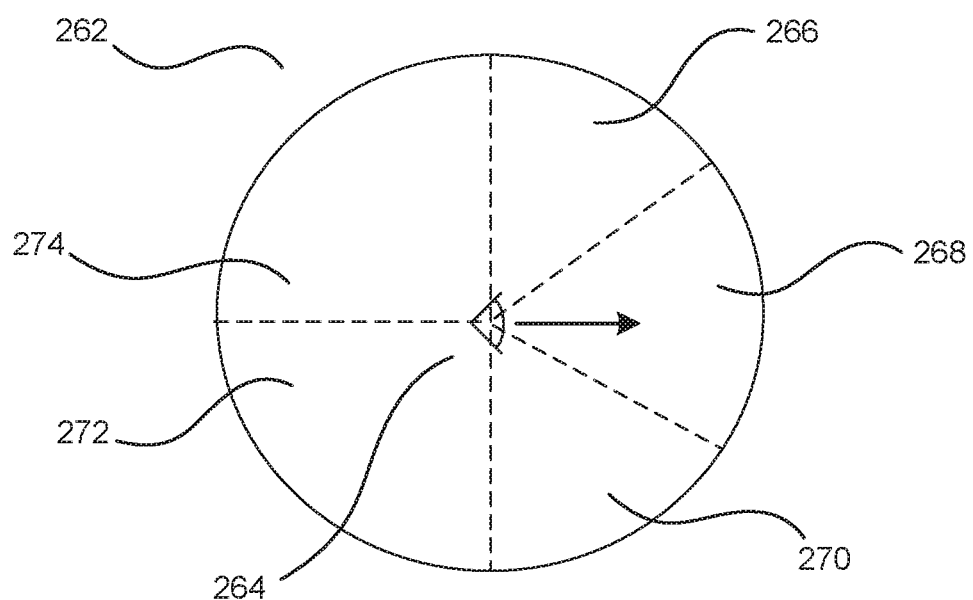

In some embodiments, the streams (e.g., angles of streams) for a spherical video can be refined, or adjusted, based at least in part on user viewing patterns. For example, FIG. 2C illustrates a diagram 242 of a spherical video that is composed of the streams 246, 248, 250, and 252. As shown, the viewport 244 is facing a direction that is between the two streams 246 and 248. In instances where the viewport 244 is facing a direction in between streams, the quality and/or experience of the spherical video being presented may degrade. Thus, in some embodiments, if a threshold number of users are determined to view a region, or direction, of the spherical video that is not served well by the existing streams 246, 248, 250, or 252, as illustrated in FIG. 2C, for example, then additional streams can be generated for the spherical video for the direction corresponding to the region or direction being viewed. For example, a determination may be made that a spherical video that has a first stream corresponding to a first direction (e.g., 0 degrees) and a second stream corresponding to a second direction (e.g., 30 degrees) needs a third stream corresponding to a third direction (e.g., 15 degrees) to be generated to enhance the user viewing experience. FIG. 2D illustrates an example diagram 262 of the spherical video in which the angles of the streams 246 and 248 of FIG. 2C have been adjusted to streams 266 and 270 with an additional stream 268 corresponding to the angle or view direction of the region that was previously unavailable in the example of FIG. 2C.

Figure 3A:
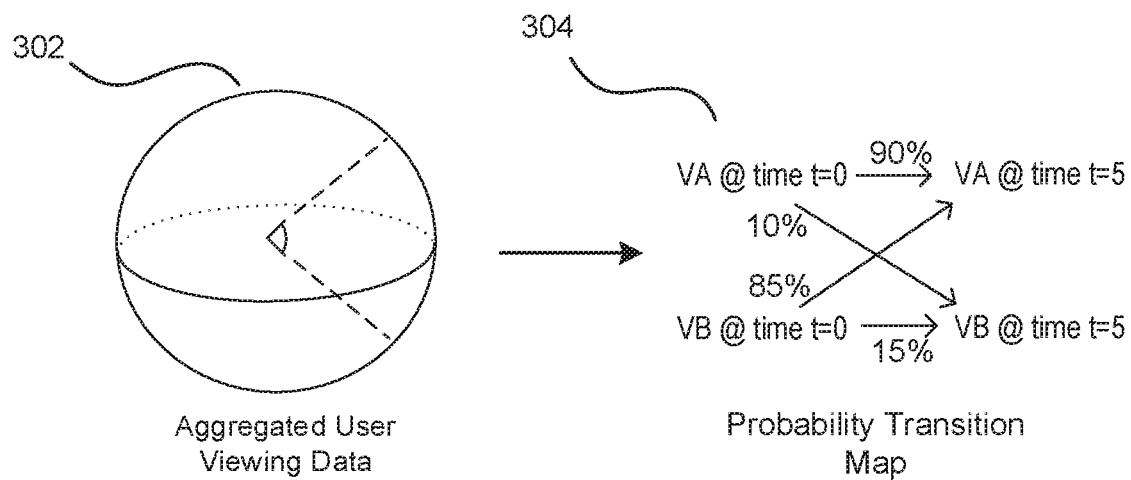
FIGS. 3A-B illustrates examples of streaming a spherical video based on social predictive data, according to an embodiment of the present disclosure.
Figure 3B:
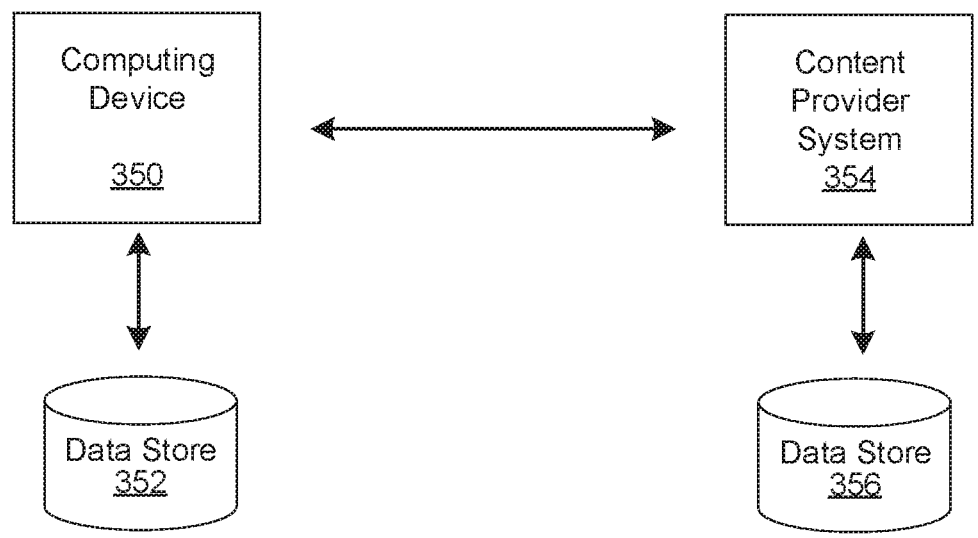

FIGS. 3A-B illustrates examples of streaming a spherical video based on social predictive data, according to an embodiment of the present disclosure. In some embodiments, changes made by various users to a viewport direction while accessing a spherical video can be measured and evaluated, in the aggregate. These aggregated changes may be used to determine directions in which users generally position the viewport while watching the spherical video at a given playback time. These determined directions may be used to predict, for a user who has not yet viewed the spherical video, what direction the user may position the viewport at a given time. Such predictions may be utilized to enhance the playback of the video, for example, by sending the appropriate stream data for a certain direction prior to the viewport direction being changed to that direction (e.g., buffering the stream before it is in use). For example, a determination may be made that, while watch a spherical video, 70 percent of users changed the direction being viewed starting from viewport A to viewport B at playback time 5 seconds (i.e., 5 seconds into playback of the spherical video) while 30 percent of users changed the direction being viewed starting from viewport A to viewport C at playback time 5 seconds. In this example, viewport A corresponds to a first viewing direction of the spherical video, viewport B corresponds to a second viewing direction of the spherical video, and viewport C corresponds to a third viewing direction of the spherical video. In various embodiments, such user data can be used to generate a probability transition map (e.g., a Markov model) that provides a likelihood of a user viewing a first viewport direction transitioning to a second viewport direction at a given playback time.

For example, FIG. 3A illustrates an example portion of a probability transition map 304 for a spherical video 302 that was generated by monitoring and measuring changes made by users to the viewport direction while viewing the spherical video 302. The number of viewports included in the probability transition map as well as the intervals at which transitions are made can vary depending on the implementation or the model used. For example, a probability transition map may include transition information for several viewports at every second of playback time for the spherical video. In this example, the probability transition map 304 indicates that users watching the spherical video at viewport A (VA) at playback time 0 seconds were 90 percent likely to remain viewing viewport A at playback time 5 seconds and such users were 10 percent likely to transition to switch to viewing viewport B (VB) at playback time 5 seconds. The probability transition map 304 also indicates that users watching the spherical video at viewport B at playback time 0 seconds were 85 percent likely to transition to viewport A at playback time 5 seconds and such users were 15 percent likely to remain viewing viewport B at playback time 5 seconds. In this example, it can be determined that users accessing viewport A or viewport B at playback time 0 seconds are very likely to be accessing viewport A at playback time 5 seconds.

In various embodiments, a probability transition map for a spherical video can be utilized to predict the viewing direction of users for the spherical video at any given playback time. Such information can be utilized to improve the streaming of video content between a computing device (e.g., mobile device, virtual reality head mounted apparatus, etc.) through which the spherical video is being accessed and the content provider system. As illustrated in FIG. 3B, in some embodiments, a probability transition map of a spherical video being accessed by a computing device 350 can be utilized by both the computing device 350 and the content provider system 354. In one example, the content provider system 354 can use the probability transition map to determine which viewports, or streams, of the spherical video should be cached, for example, in the data store 356 that is being utilized by the content provider system 354, so that such data can quickly be provided to the appropriate computing devices. Similarly, in some embodiments, the computing device 350 can utilize the probability transition map to request and buffer the viewports, or streams, that the user accessing the computing device 350 is likely to view over some period of time. For example, if the probability transition map indicates that 99 percent of users who look at viewport A of the spherical video at playback time 1 second will continue to look at viewport A at playback time 5 seconds, then the computing device 350 can request and/or buffer data corresponding to viewport A. In another example, if the probability transition map indicates that 50 percent of users that look at viewport A at playback time 1 second will look at viewport A at playback time 5 seconds and 40 percent of users that look at viewport A at playback time 1 second will look at viewport B at playback time 5 seconds, then the computing device 350 can request and/or buffer data corresponding to both viewport A and viewport B.

As mentioned, a probability transition map can be generated for a given spherical video by analyzing user viewing patterns in the aggregate. In some embodiments, however, multiple probability transition maps can be generated for a given spherical video with each probability transition map corresponding to a particular group of users that, for example, exhibit similar viewing patterns or exhibit any other similar characteristic (e.g., demographics including geographic location, age, actions or interests expressed on a social-networking system, etc.). In one example, there may be one group of users that prefer to watch action scenes while another group of users prefers to watch scenic scenes. In some embodiments, a clustering algorithm may be applied to segregate such users into separate groups based on correlating which viewports the users watched at a given playback time. A separate probability transition map may be determined and utilized for such groups of users. For example, if it is known that a user accessing a spherical video through the computing device 350 belongs to a group of users that prefer to watch a certain stream, or viewport, of the video at a particular playback time, then the computing device 350 can be configured to utilize such information to customize the requesting and/or buffering of the stream, or viewport, for the particular playback time. Similarly, the content provider system 354 can optimize the caching of the relevant stream or viewport based on such information.

In some embodiments, the approaches described herein may be applied to legacy clients (e.g., video players) that are not able to playback spherical videos and/or utilize virtual reality apparatuses. In one example, a viewport for such legacy clients may be determined based on the directions of a spherical video that are viewed by a threshold number of users throughout the timeline of the spherical video. Such information may be determined, for example, using probability transition maps that have been determined for the spherical video. The viewports determined for legacy clients can, therefore, move through the spherical video over time so that the legacy clients can still see the relevant portions of the spherical video even without a video player that is able to process spherical videos.

Figure 4A:
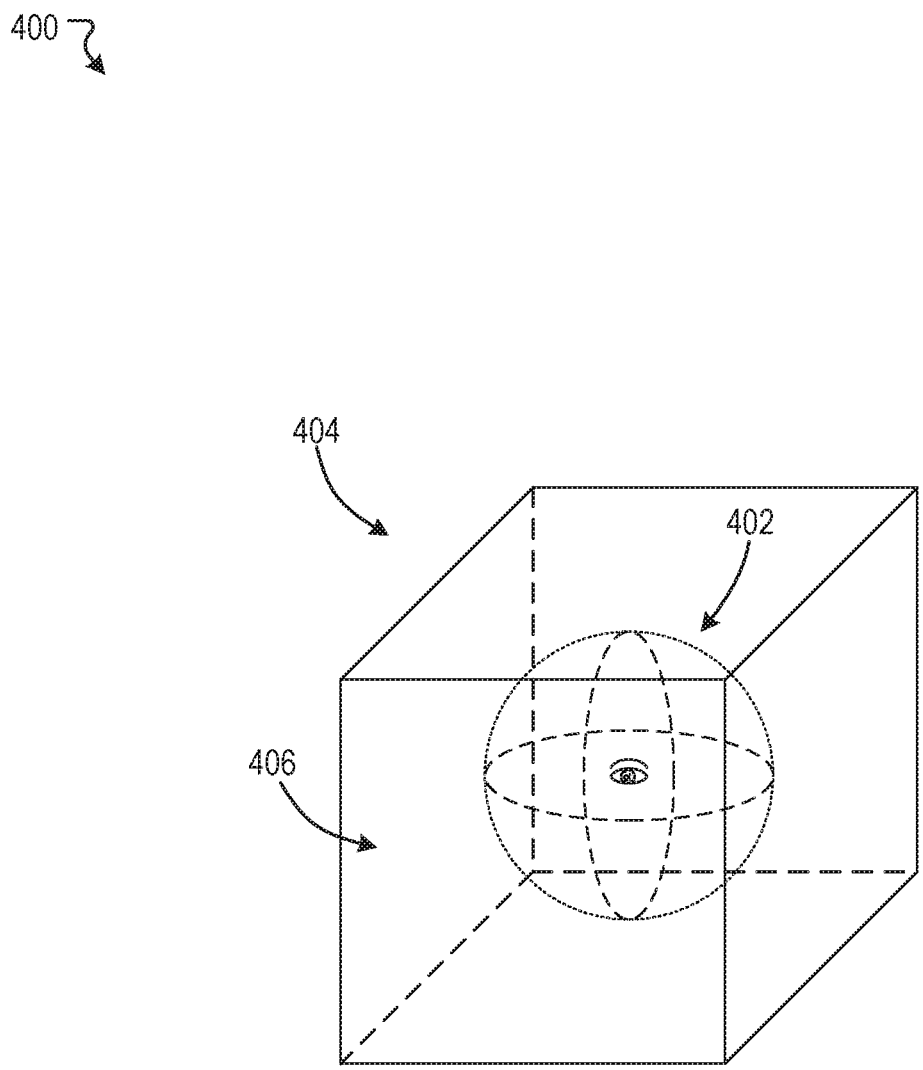
FIG. 4A illustrates an example scenario associated with utilizing polygonal media mapping, according to an embodiment of the present disclosure.

FIG. 4A illustrates an example scenario 400 associated with utilizing polygonal media mapping, according to an embodiment of the present disclosure. The example scenario 400 illustrates a spherical media content item 402 within a three dimensional cube object 404 onto which the spherical media content item 402 is to be mapped, such as for data efficiency purposes. In some cases, the spherical media content item 402 can correspond to a spherical video (e.g., a 360-degree spherical video). As shown, the three dimensional cube object 404 can be formed by six faces or surfaces (e.g., squares), including a front face 406.

In some embodiments, a front portion of the spherical video 402 can be mapped onto the front face 406 of the cube object 404. Similarly, a back portion of the spherical video 402 can be mapped onto a back face of the cube object 404. A top portion of the spherical video 402 can be mapped onto a top face of the cube object 404. A bottom portion of the spherical video 402 can be mapped onto a bottom face of the cube object 404. A left portion of the spherical video 402 can be mapped onto a left face of the cube object 404. A right portion of the spherical video 402 can be mapped onto a right face of the cube object 404.

Figure 4B:
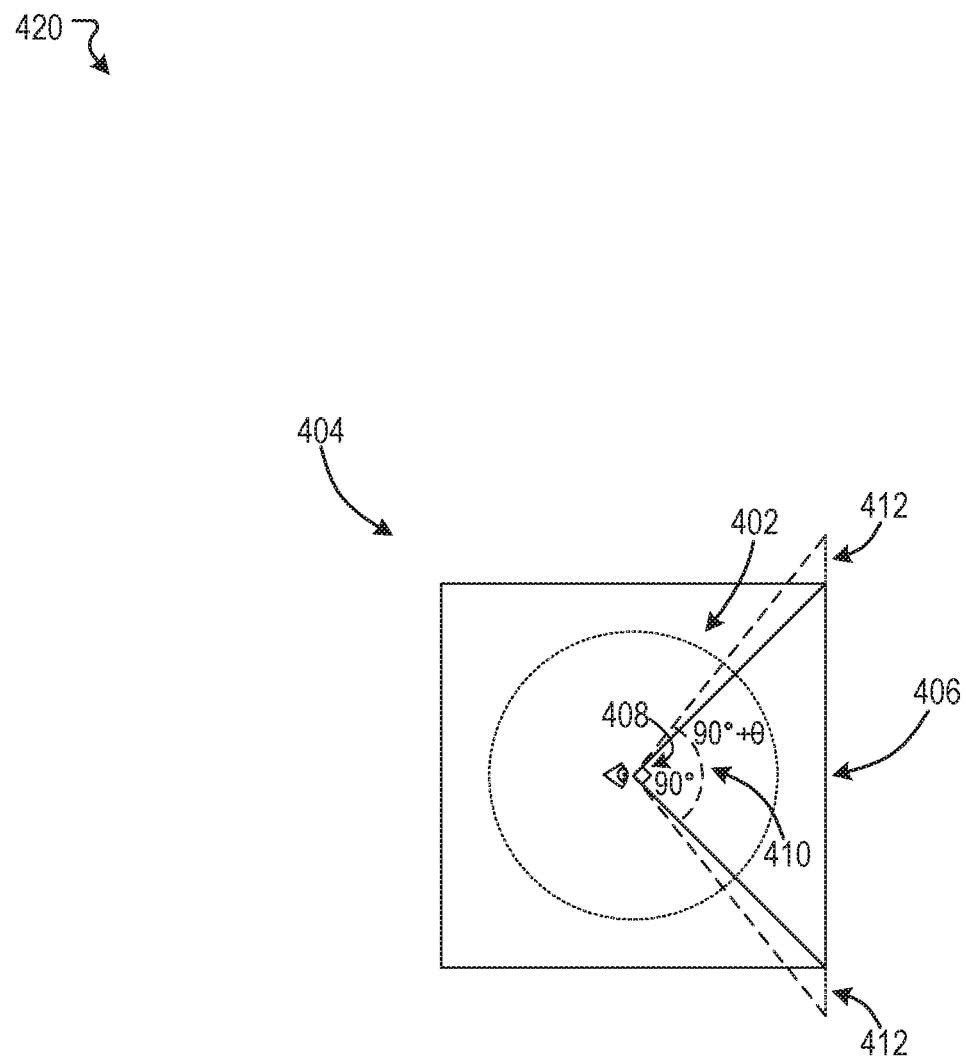
FIG. 4B illustrates an example scenario associated with utilizing edge expansion for polygonal media mapping, according to an embodiment of the present disclosure.

FIG. 4B illustrates an example scenario 420 associated with utilizing edge expansion for polygonal media mapping, according to an embodiment of the present disclosure. The example scenario 420 illustrates a cross-sectional view of the spherical media content item 402 and the three dimensional cube object 404 (i.e., cube) of FIG. 4A. In some cases, the cross-sectional view can correspond to a vertical cross-sectional view, such as viewing through the right side of the cube 404. In some instances, the cross-sectional view can correspond to a horizontal cross-sectional view, such as viewing through the top side of the cube 404.

As discussed previously, the front portion of the spherical media content item 402 (e.g., spherical video) can be mapped or projected onto the front face 406 of the cube 404. In some cases, conventional approaches to cube mapping can utilize a mapping angle 408 of 90 degrees, as shown in FIG. 4B. As such, a portion of the spherical video 402 between the two legs of the mapping angle 408 can correspond to the front portion of the spherical video 402 and can be mapped or projected onto the front face 406 of the cube 404.

Various embodiments of the disclosed technology can utilize polygonal edge expansion for spherical media mapping. As shown in the example scenario 420, the disclosed technology can expand the edges of the front face 406 outward based on an expanded mapping angle 410 that is greater than the original mapping angle 408 of 90 degrees. As a result, the front face 406 can be expanded to include the expanded edges 412. Moreover, the front portion of the spherical video 402 can correspond to a portion of the spherical video 402 between the two legs of the expanded mapping angle 410 and can be mapped or projected onto the front face 406 including the expanded edges 412. This process can be repeated for all other faces of the cube 404. Thus, when the six faces (including their respective expanded edges) are connected to form a cubical representation of the spherical video 402 for presentation, the distortions and/or other undesirable visual qualities potentially located where the faces connect can be reduced or removed by the disclosed technology. The respective expanded edges can result in overlapping portions or subregions in the faces or segments.

In one instance, when the original mapping angle 408 corresponds to 90 degrees, the expanded mapping angle 410 can correspond to 100 degrees. It should be understood that any suitable degree value can be used. It is also contemplated that all examples herein are provided for illustrative purposes and that many variations associated with the disclosed technology are possible.

Figure 4C:
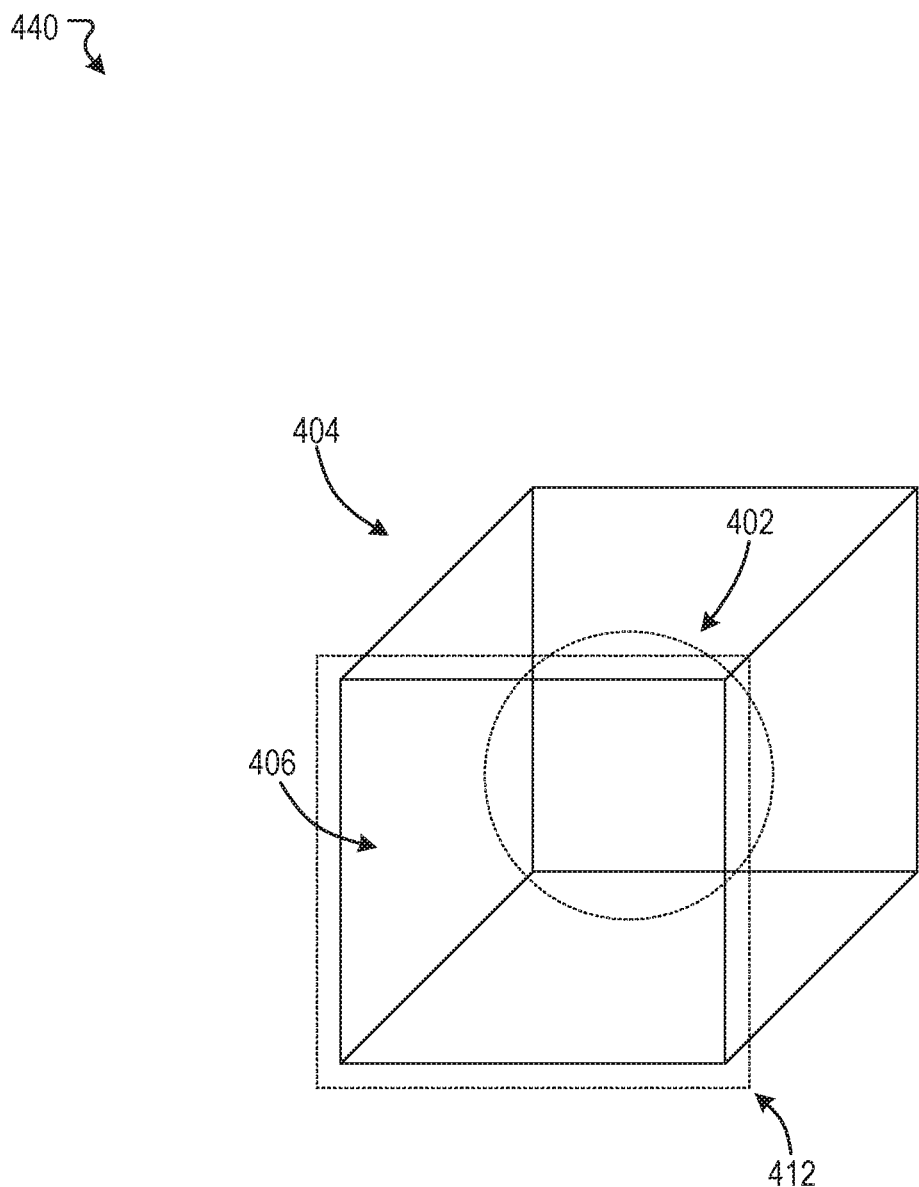
FIG. 4C illustrates an example scenario associated with utilizing edge expansion for polygonal media mapping, according to an embodiment of the present disclosure.

FIG. 4C illustrates an example scenario 440 associated with utilizing edge expansion for polygonal media mapping, according to an embodiment of the present disclosure. The example scenario 440 illustrates another view of the spherical video 402, the cube 404, and the front face 406 including the expanded edges 412 of FIG. 4B.

Figure 4D:
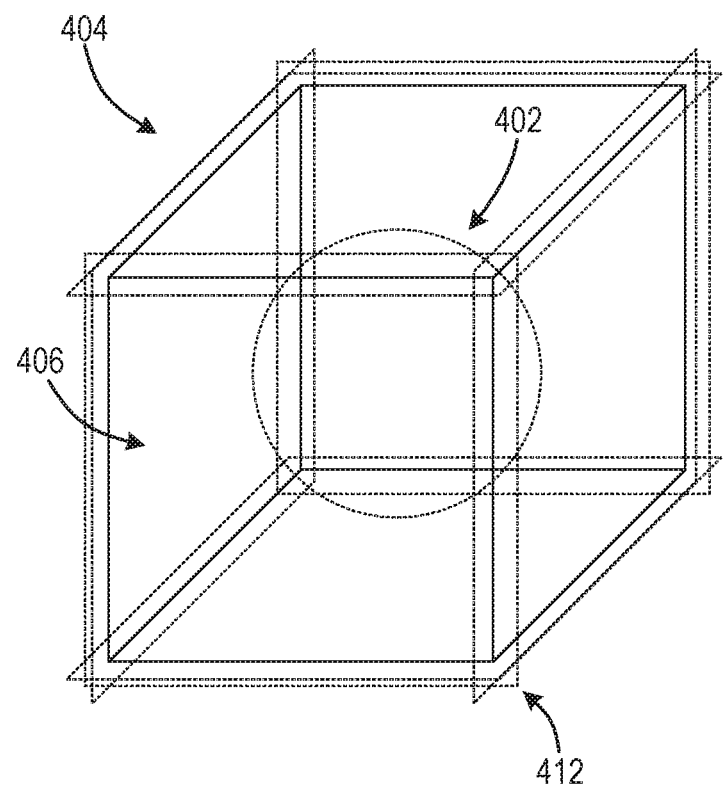
FIG. 4D illustrates an example scenario associated with utilizing edge expansion for polygonal media mapping, according to an embodiment of the present disclosure.

FIG. 4D illustrates an example scenario 460 associated with utilizing edge expansion for polygonal media mapping, according to an embodiment of the present disclosure. The example scenario 460 illustrates the spherical video 402, the cube 404, and the front face 406 including the expanded edges 412 of FIG. 4C. Moreover, the example scenario 460 of FIG. 4D illustrates all other expanded edges included with all six faces of the cube 406.

Figure 4E:
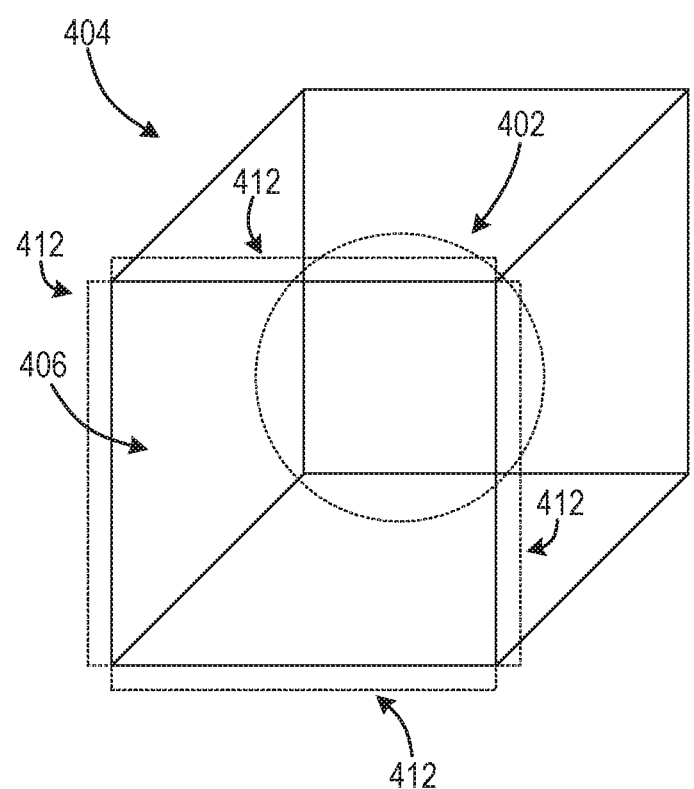
FIG. 4E illustrates an example scenario associated with utilizing edge expansion for polygonal media mapping, according to an embodiment of the present disclosure.

FIG. 4E illustrates an example scenario 480 associated with utilizing edge expansion for polygonal media mapping, according to an embodiment of the present disclosure. The example scenario 480 illustrates the spherical video 402, the cube 404, and the front face 406 of FIG. 4D. In some implementations, as shown in the example scenario 480 of FIG. 4E, the expanded edges 412 of all six faces of the cube 404 can appear to be flaps extending outward from each face.

Again, many variations associated with the disclosed technology are possible. For instance, the three dimensional geometrical object need not be limited to a cube object, and any suitable polygons can be used as faces for the three dimensional geometrical object. Furthermore, as discussed above, various embodiments of the present disclosure can acquire (i.e., retrieve, receive, identify, select, access, etc.) a spherical media content item. A three dimensional geometrical object including a plurality of polygonal faces can be selected (i.e., defined, preset, identified, etc.). A respective set of edges, included with each polygonal face in the plurality of polygonal faces, can be expanded outward to produce a respective set of expanded edges included with each polygonal face. A respective portion of the spherical media content item can be mapped to each polygonal face including the respective set of expanded edges. At least a first polygonal face including a first set of expanded edges can be connectable to at least a second polygonal face including a second set of expanded edges to produce at least a portion of a representation of the spherical media content item. In an embodiment, at least the first polygonal face including the first set of expanded edges being connectable to at least the second polygonal face including the second set of expanded edges can reduce one or more distortions where at least the first polygonal face and at least the second polygonal face are connectable.

In an embodiment, the three dimensional geometrical object can correspond to a cube. The plurality of polygonal faces can correspond to six squares. The six squares can include a top view square, a left view square, a front view square, a right view square, a back view square, and a bottom view square.

In an embodiment, an amount of outward expansion for the respective set of edges can be determined. The amount of outward expansion can be based on an expanded mapping angle greater than 90 degrees.

Figure 5A:
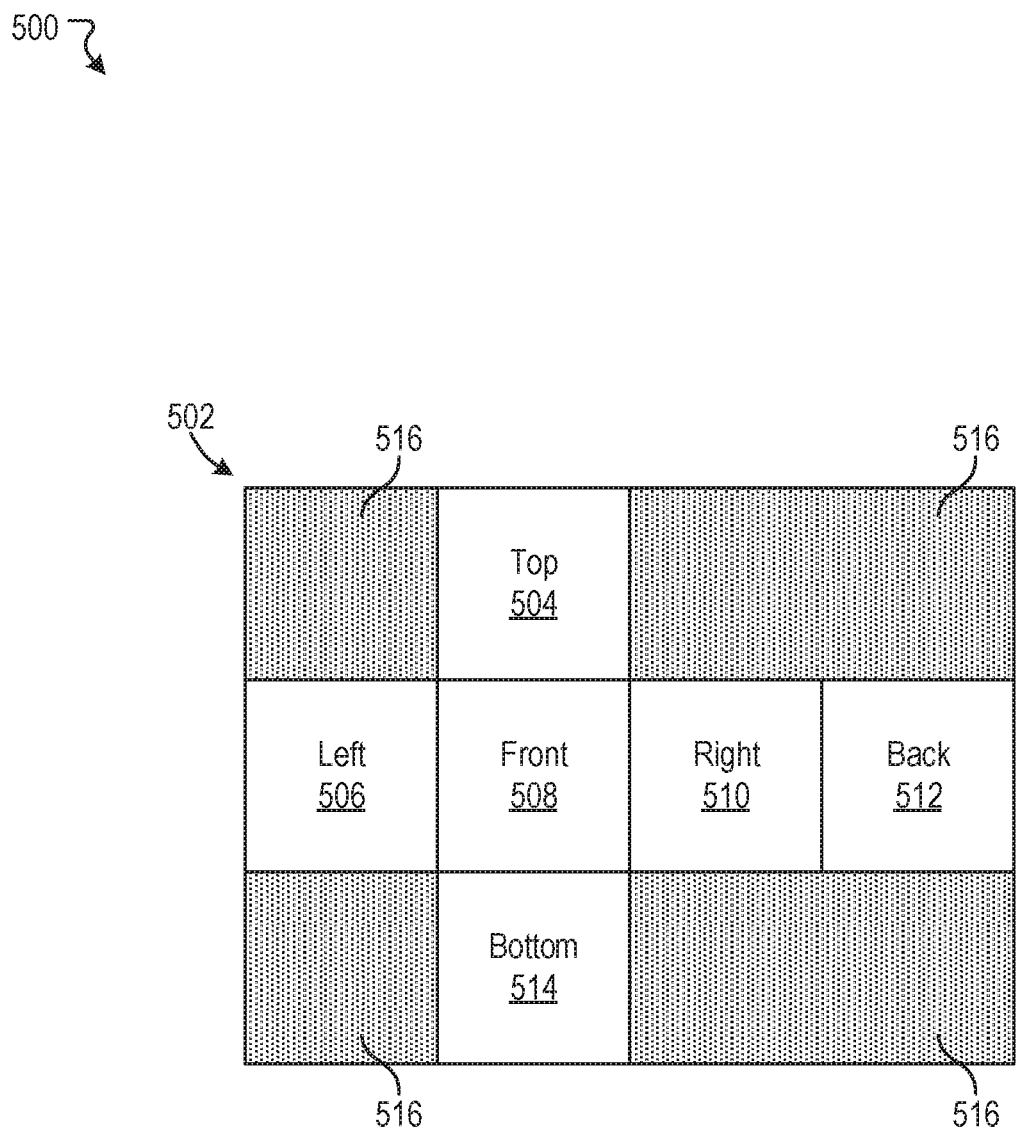
FIG. 5A illustrates an example scenario associated with utilizing polygonal media mapping, according to an embodiment of the present disclosure.

FIG. 5A illustrates an example scenario 500 associated with utilizing polygonal media mapping, according to an embodiment of the present disclosure. The example scenario 500 illustrates a virtual rectangle 502 in which a plurality of polygonal faces can be packed or packaged. The area of the virtual rectangle may, for example, represent or be associated with a total amount of data (e.g., a file size) used to represent a content item. The plurality of polygonal faces can be included in, can form, and/or can be included as a part of, a three dimensional geometric object. In this example scenario 500, the plurality of polygonal faces can include six squares or faces connectable to form a three dimensional cube object. The three dimensional cube object can represent a spherical media content item and/or can be used for mapping the spherical media content item. In some embodiments, the six squares can be packed into the virtual rectangle 502 for transmission and potential presentation. However, conventional approaches can be inefficient.

For instance, there can be a top view square 504 (for mapping or representing a top portion of the spherical media content item), a left view square 506 (for mapping or representing a left portion of the spherical media content item), a front view square 508 (for mapping or representing a front portion of the spherical media content item), a right view square 510 (for mapping or representing a right portion of the spherical media content item), a back view square 512 (for mapping or representing a back portion of the spherical media content item), and a bottom view square 514 (for mapping or representing a bottom portion of the spherical media content item), as shown. However, in accordance with conventional approaches to fitting and/or placing the six squares in the virtual rectangle 502 for media transmission and/or processing, there can be a significant amount of wasted data space 516, as shown in FIG. 5A.

FIG. 5B illustrates an example scenario 520 associated with utilizing polygonal media mapping, according to an embodiment of the present disclosure. The example scenario 520 illustrates a virtual rectangle 522 in which a set of six squares (e.g., a right view square 524, a left view square 526, a top view square 528, a bottom view square 530, a front view square 532, and a back view square 534) can be fitted, placed, packed, or packaged.

In some implementations, the disclosed technology can provide an improved approach to packing such data for transmission, storage, usage, and/or other processing. As shown in the example scenario 520, in an embodiment, the six squares can be organized into two horizontal rows and three vertical columns. The six squares can be organized to form the virtual rectangle 522 which may be smaller in total size in comparison to virtual rectangle 502. Accordingly, the disclosed technology may reduce and/or remove wasted data space, as shown. This improves data efficiency. The virtual rectangle 522 can then be transmitted for presentation. The representation of the spherical media content item can be enabled to be presented based on reorganizing the six squares. The representation of the spherical media content item can correspond to a cubical representation.

In an embodiment, reorganizing the six squares can include placing the top view square into an inner top square of the cubical representation, placing the left view square into an inner left square of the cubical representation, placing the front view square into an inner front square of the cubical representation, placing the right view square into an inner right square of the cubical representation, placing the back view square into an inner back square of the cubical representation, and placing the bottom view square into an inner bottom square of the cubical representation.

In one instance, the placement and/or order of the six squares in the virtual rectangle 522 can be modified. In another instance, the orientation, position, and/or shape of the virtual rectangle 522 can be modified, such as to have three horizontal rows and two vertical columns instead. It should be appreciated that many variations are possible.

Figure 5C:
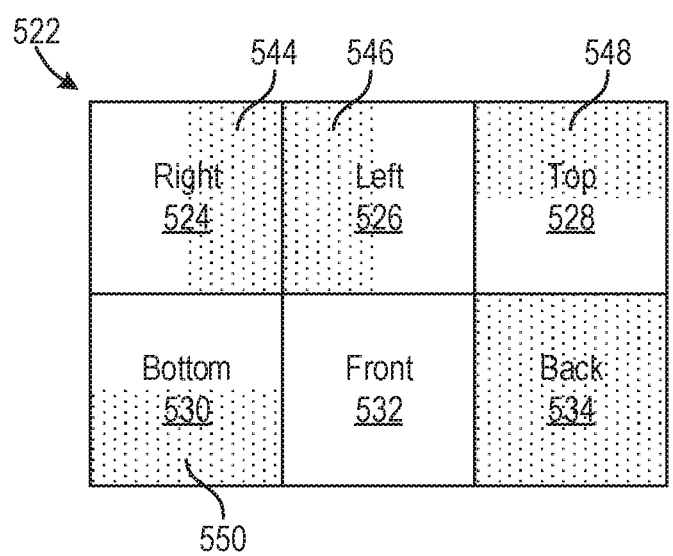
FIG. 5C illustrates an example scenario associated with utilizing polygonal media mapping, according to an embodiment of the present disclosure.

FIG. 5C illustrates an example scenario 540 associated with utilizing polygonal media mapping, according to an embodiment of the present disclosure. The example scenario 540 illustrates the virtual rectangle 522 of FIG. 5B in which the set of six squares (e.g., a right view square 524, a left view square 526, a top view square 528, a bottom view square 530, a front view square 532, and a back view square 534) can be fitted, placed, packed, or packaged. The six squares or faces can be connectable to form a three dimensional cube, which can represent a spherical media content item and/or onto which the spherical media content item can be mapped.

In an embodiment, the disclosed technology can identify a back portion of the cube. A subset of the six squares that represents, at least in part, the back portion of the cube can also be identified. An image obscuring process (e.g., low-pass filtering or blurring) can be applied to at least a portion of each square in the subset. In some cases, the image obscuring process applied to at least the portion of each square in the subset can improve efficiency in media processing for the spherical media content item, such as in video compression for a spherical video. As shown in the example scenario 540 of FIG. 5C, a blurring process can be applied to a right portion 544 of the right view square 524, a left portion 546 of the left view square 526, a top portion 548 of the top view square 528, a bottom portion 550 of the bottom view square 530, none of the front view square 532, and an entirety of the back view square 534. Moreover, when a cubical representation of the spherical media content item is formed based on the six squares, the cubical representation can have higher visual quality (e.g., resolution) in its front portion (or any portion currently being viewed or typically more frequently viewed by users) and lower visual quality in its back portion, where users are not currently viewing or where they typically view less frequently.

It should be understood that many variations are possible. For example, the image obscuring process can pixelate at least the portion of each square in the identified subset, draw/color over at least the portion of each square in the identified subset, and/or remove/erase at least the portion of each square in the identified subset, etc.

Figure 5D:
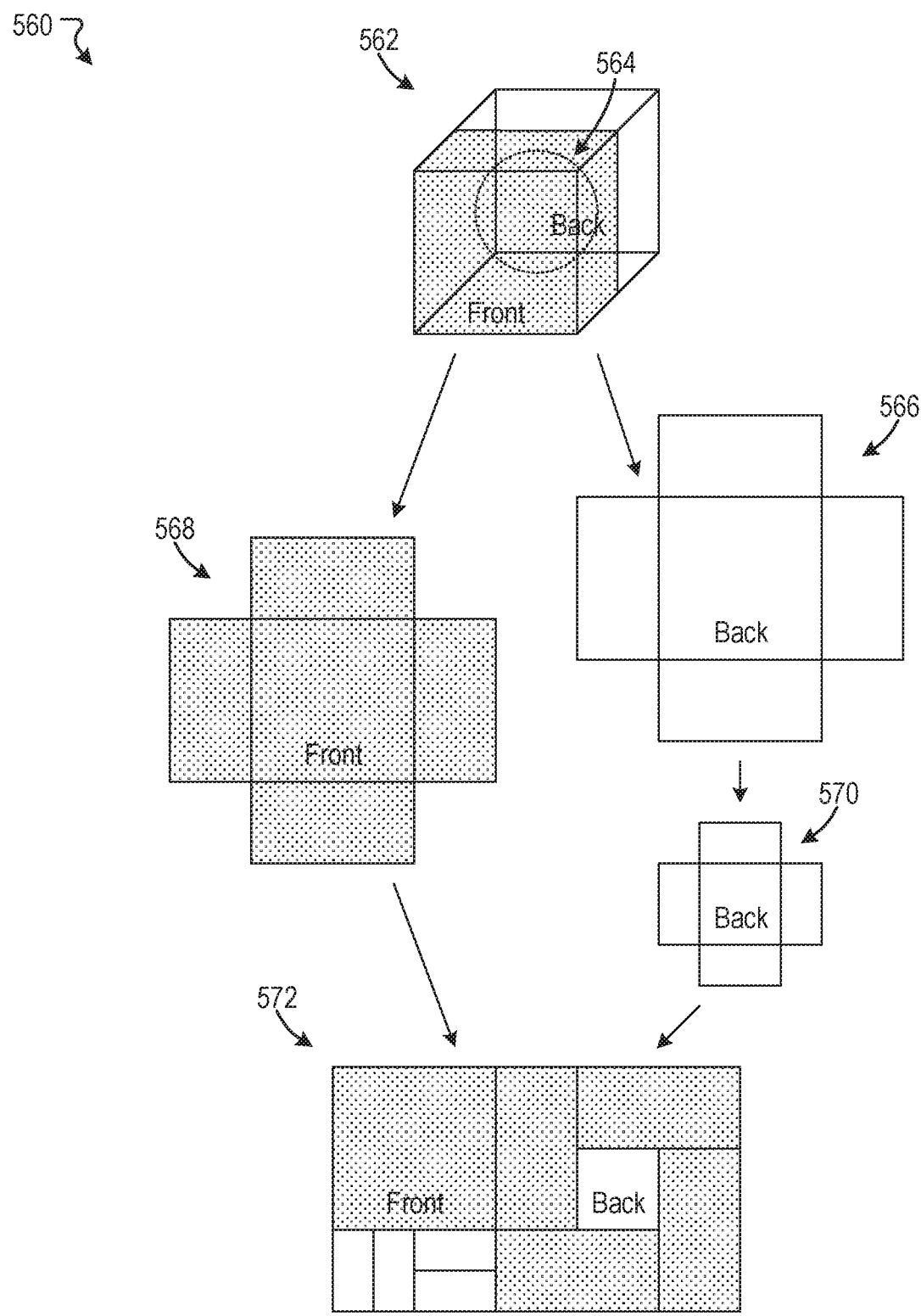
FIG. 5D illustrates an example scenario associated with utilizing polygonal media mapping, according to an embodiment of the present disclosure.

FIG. 5D illustrates an example scenario 560 associated with utilizing polygonal media mapping, according to an embodiment of the present disclosure. The example scenario 560 illustrates a three dimensional cube 562, which can represent a spherical media content item 564 and/or onto which the spherical media content item 564 can be mapped.

In an embodiment, the disclosed technology can identify a back portion of the cube. A remaining portion (e.g., non-back portion, front portion, etc.) can also be identified. A first subset 566 of rectangular portions representing, at least in part, the back portion of the cube and a second subset 568 of rectangular portions representing, at least in part, the remaining portion (e.g., front portion) of the cube can be identified out of the six squares. The first subset 566 of rectangular portions can be downscaled to produce a downscaled subset 570 of rectangular portions. The downscaled subset 570 of rectangular portions and the second subset 568 of rectangular portions can be downscaled to form a virtual rectangle 572. Accordingly, when a cubical representation of the spherical media content item 564 is formed based on the downscaled subset 570 of rectangular portions and the second subset 568 of rectangular portions, the cubical representation can have higher visual quality (e.g., resolution) in its front portion and lower visual quality in its back portion, where users typically view less frequently. Again, there can be many variations or other possibilities. For instance, in some cases, the frame rate of video playback for the back portion can be less than that of the front portion.

Figure 6A:
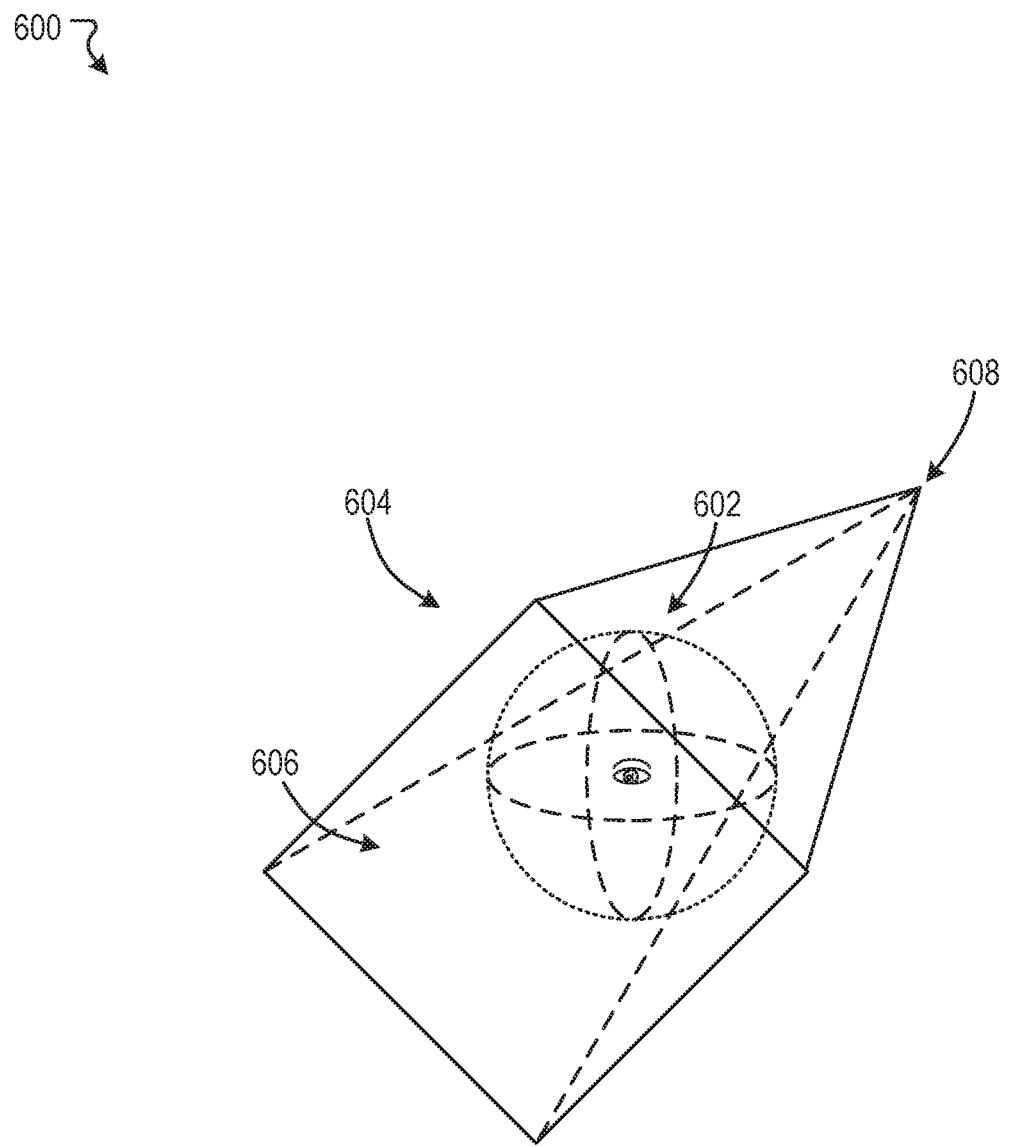
FIG. 6A illustrates an example scenario associated with mapping spherical media to a three dimensional geometrical object with a converged point, according to an embodiment of the present disclosure.

FIG. 6A illustrates an example scenario 600 associated with mapping spherical media to a three dimensional geometrical object with a converged point, according to an embodiment of the present disclosure. In some instances, various embodiments of the disclosed technology can acquire a spherical media content item 602. A three dimensional geometrical object 604 including a base 606 and one or more object sides connected to the base can be selected. The one or more object sides can extend backward and narrow progressively to a converged point 608. The spherical media content item 602 can be mapped onto the three dimensional geometrical object 604. A front portion of the spherical media content item 602 can be mapped onto at least a portion of the base 606. A back portion of the spherical media content item can be mapped onto at least a portion of the one or more object sides.

As shown in the example scenario 600, in an embodiment, the three dimensional geometrical object 604 can be associated a pyramid shape. The base 606 can be associated with a diamond shape. A top sub-portion of the front portion of the spherical media content item 602 can be mapped to a top area of the diamond shape. A bottom sub-portion of the front portion of the spherical media content item 602 can be mapped to a bottom area of the diamond shape. A left sub-portion of the front portion of the spherical media content item 602 can be mapped to a left area of the diamond shape. A right sub-portion of the front portion of the spherical media content item 602 can be mapped to a right area of the diamond shape. Additionally, in an embodiment, the one or more object sides includes four triangles, as shown in FIG. 6A.

Moreover, in an embodiment, mapping the spherical media content item onto the three dimensional geometrical object can produce a higher graphical quality at the base relative to progressively lower graphical qualities in the one or more object sides. This can be beneficial because users typically spend more time viewing the base, which corresponds to the front portion of the spherical media content item. Furthermore, the diamond shape can be advantageous because users typically spend more time viewing the center and corners of the diamond shape (top, bottom, left, and right) rather than the center and corners of a square or rectangular shape (top left, top right, bottom left, bottom right). For instance, users are more likely to move their heads up and down, and left and right, rather than diagonally.

Figure 6B:
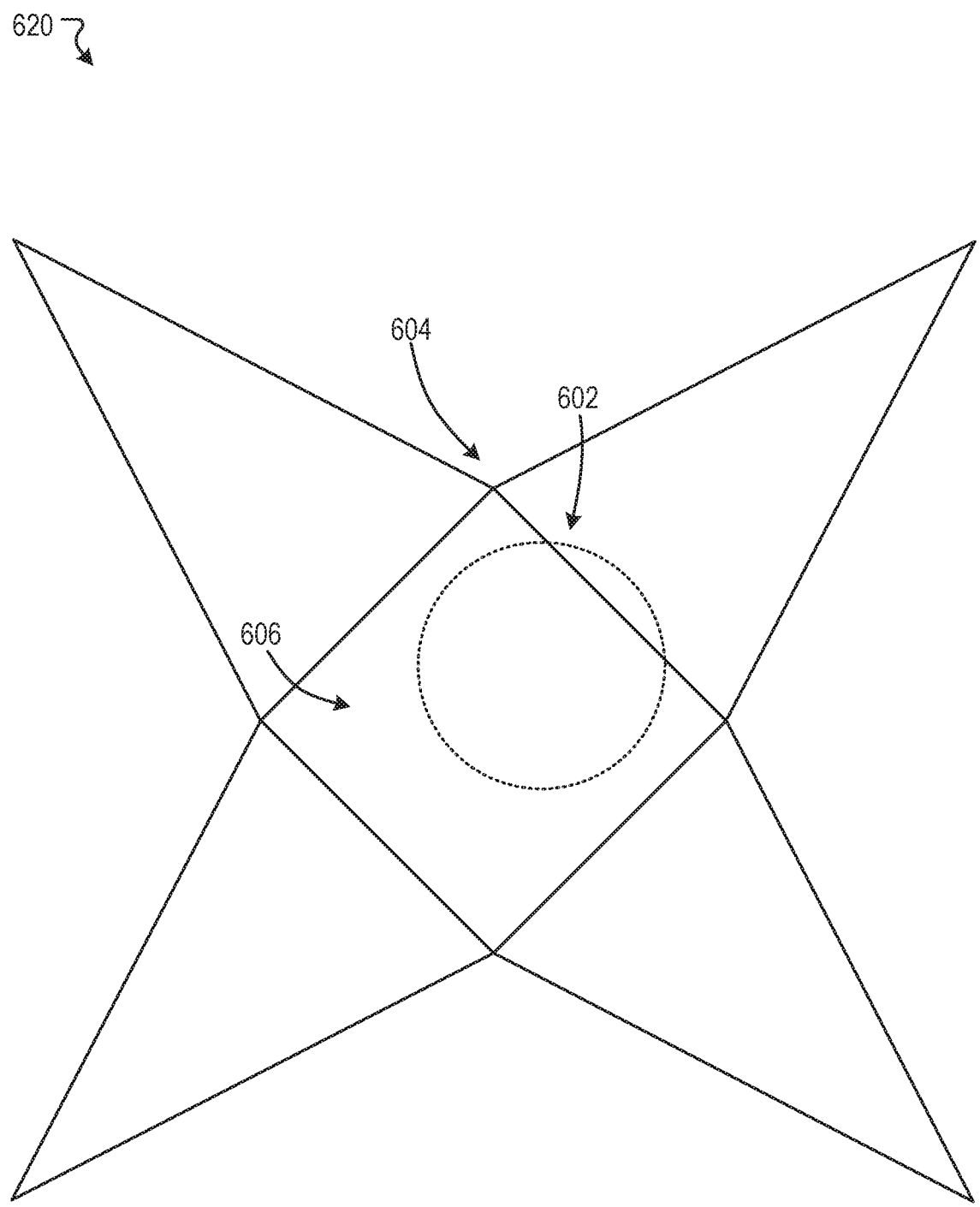
FIG. 6B illustrates an example scenario associated with mapping spherical media to a three dimensional geometrical object with a converged point, according to an embodiment of the present disclosure.

FIG. 6B illustrates an example scenario 620 associated with mapping spherical media to a three dimensional geometrical object with a converged point, according to an embodiment of the present disclosure. The example scenario 620 illustrates the spherical media content item 602 of FIG. 6A. However, in the example scenario 620 of FIG. 6B, the one or more object sides of the three dimensional geometrical object 604 are shown to be folded outward and brought into the same plane as the base 606.

Figure 6C:
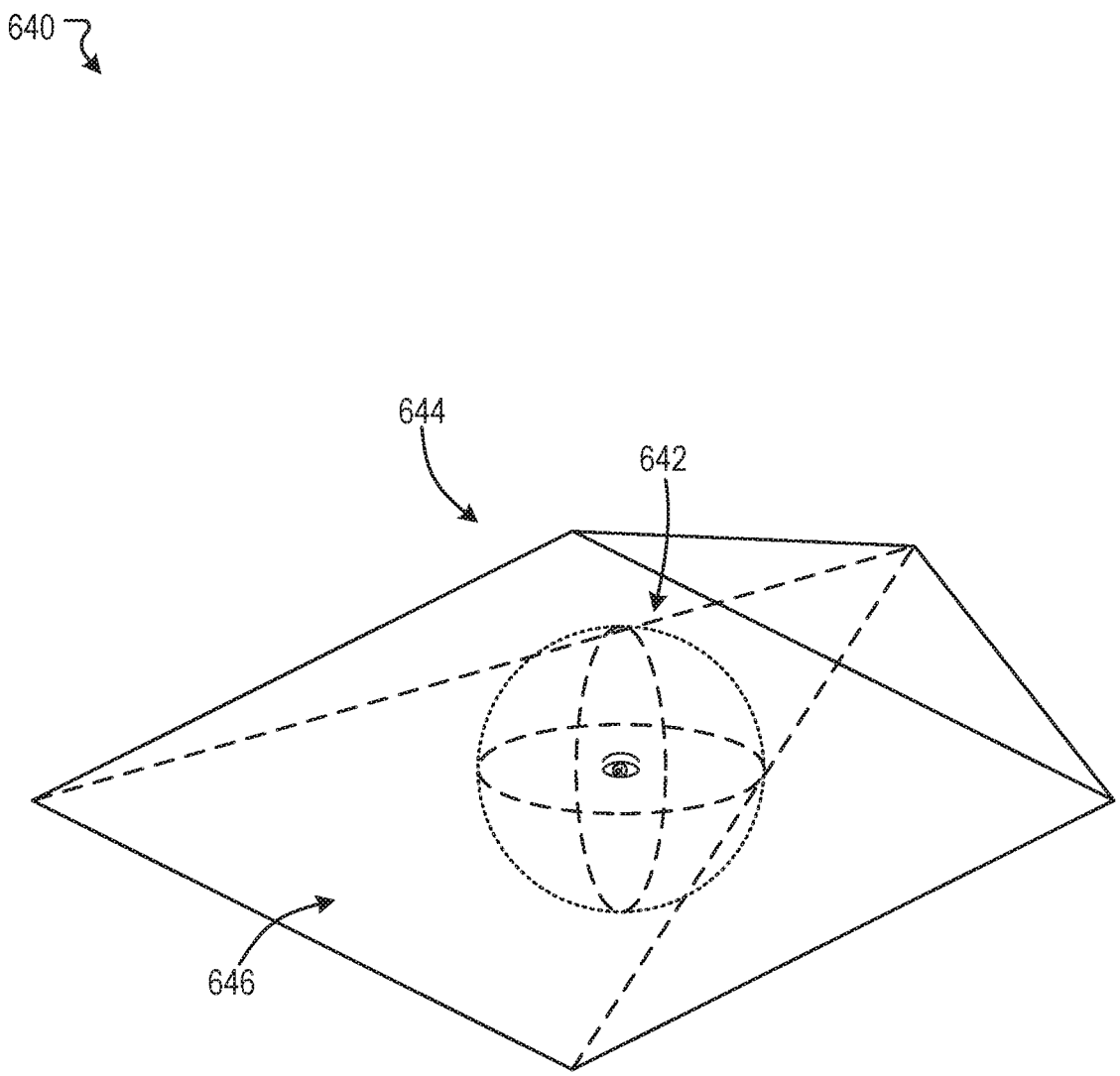
FIG. 6C illustrates an example scenario associated with mapping spherical media to a three dimensional geometrical object with a converged point, according to an embodiment of the present disclosure.

FIG. 6C illustrates an example scenario 640 associated with mapping spherical media to a three dimensional geometrical object with a converged point, according to an embodiment of the present disclosure. The example scenario 640 illustrates a spherical media content item 642 and a three dimensional geometrical object 644 with a base 646. In this example scenario 640, the base 646 of the three dimensional geometrical object 644 corresponds to a diamond having a width that is longer in than its height. Accordingly, when the front portion of the spherical media content item 642 is mapped onto the base 646, users can view more content horizontally than vertically. Many variations are possible.

Figure 6D:
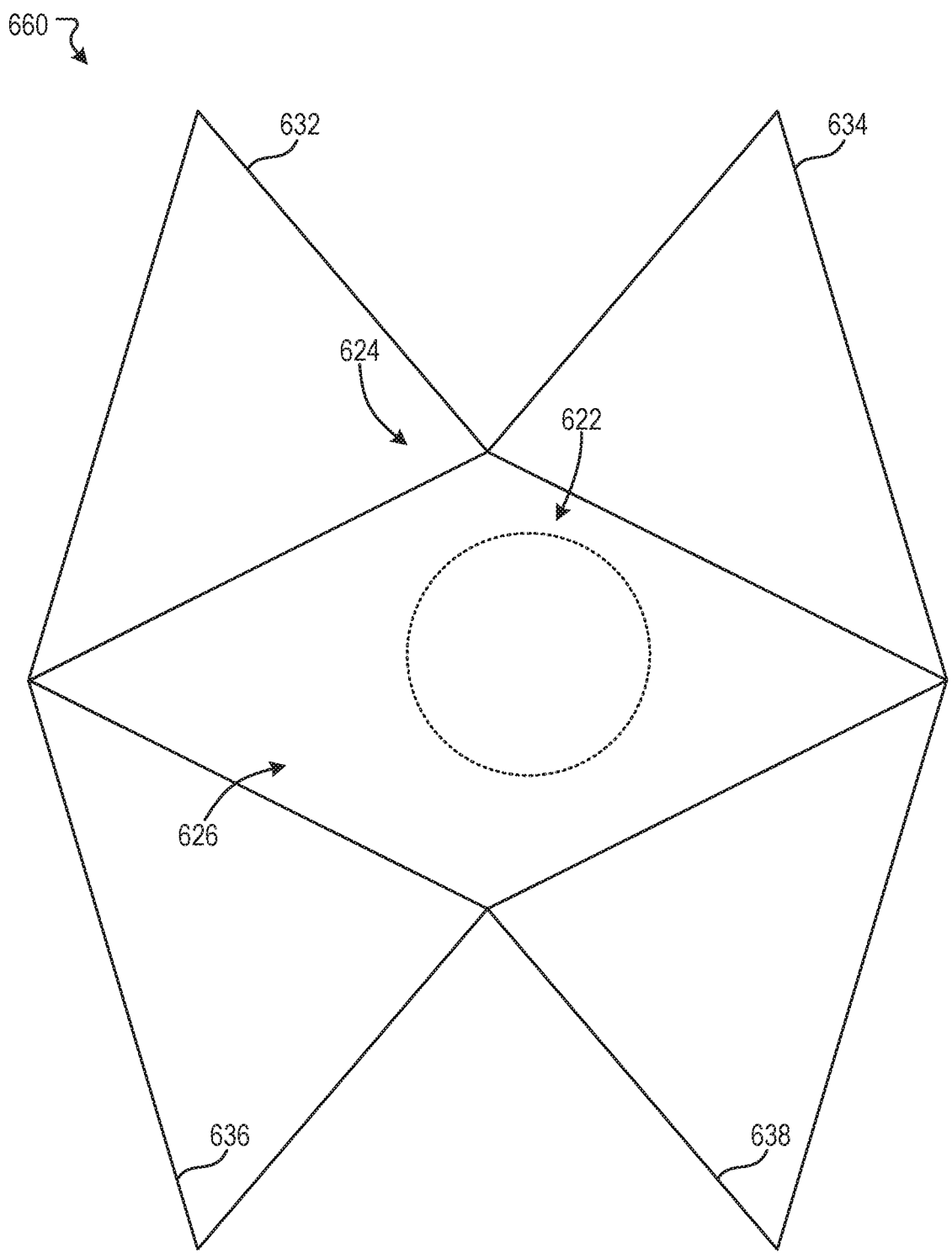
FIG. 6D illustrates an example scenario associated with mapping spherical media to a three dimensional geometrical object with a converged point, according to an embodiment of the present disclosure.

FIG. 6D illustrates an example scenario 660 associated with mapping spherical media to a three dimensional geometrical object with a converged point, according to an embodiment of the present disclosure. The example scenario 660 illustrates the spherical media content item 622 of FIG. 6C. However, in the example scenario 660 of FIG. 6D, the one or more object sides (e.g., a first triangle 632, a second triangle 634, a third triangle 636, a fourth triangle 638) of the three dimensional geometrical object 624 are shown to be folded outward and brought into the same plane as the base 626.

Figure 6E:
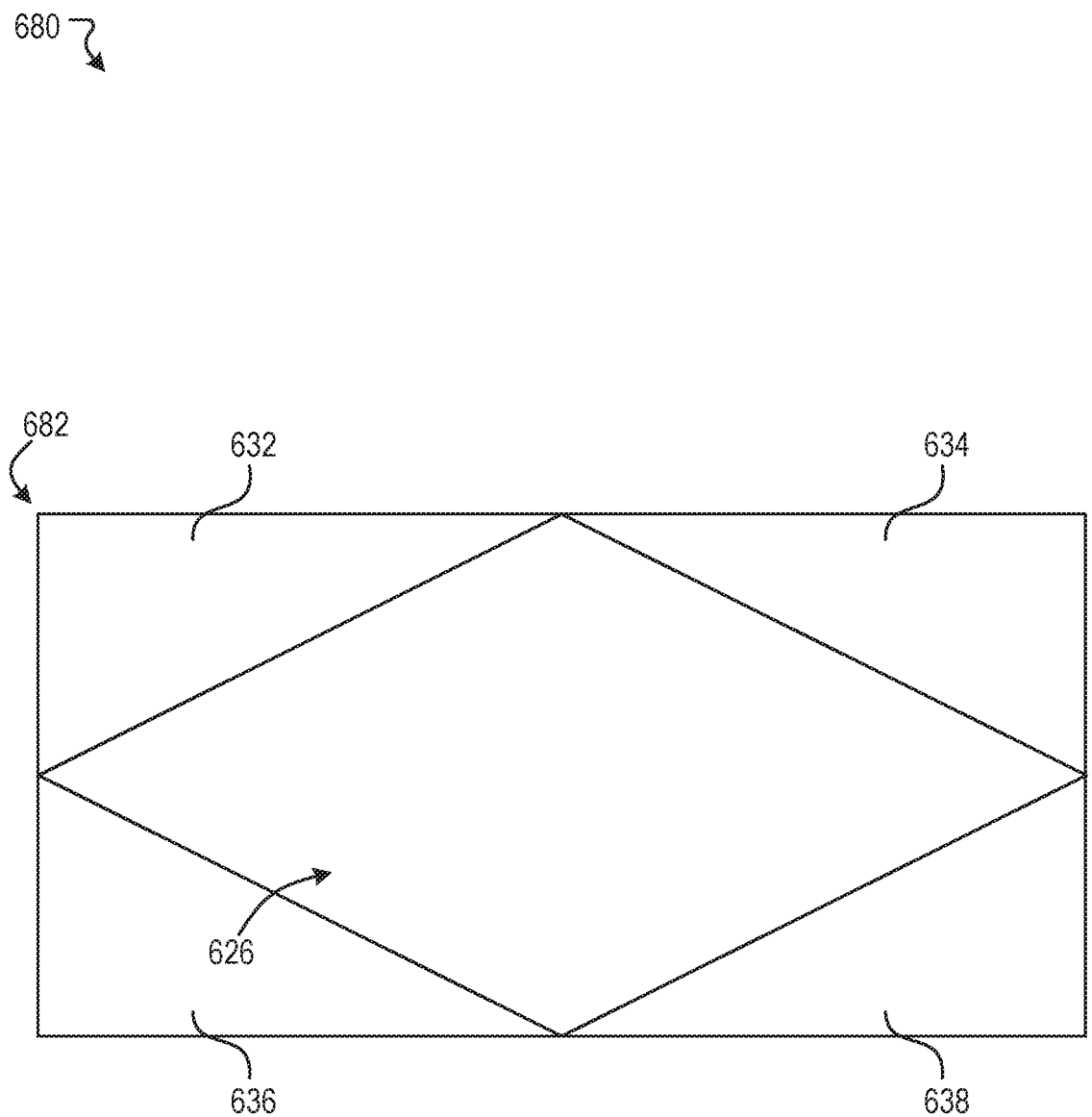
FIG. 6E illustrates an example scenario associated with mapping spherical media to a three dimensional geometrical object with a converged point, according to an embodiment of the present disclosure.

FIG. 6E illustrates an example scenario 680 associated with mapping spherical media to a three dimensional geometrical object with a converged point, according to an embodiment of the present disclosure. In an embodiment, the diamond shape (associated with the base 626) can be fitted within a virtual rectangle 682. This can improve data efficiency, such as for transmission and/or video compression. A top point of the diamond shape can be in contact with a top side (e.g., a top edge, a top border, etc.) of the virtual rectangle 682. A bottom point of the diamond shape can be in contact with a bottom side of the virtual rectangle 682. A left point of the diamond shape can be in contact with a left side of the virtual rectangle 682. A right point of the diamond shape can be in contact with a right side of the virtual rectangle 682.

In an embodiment, the four triangles (e.g., a first triangle 632, a second triangle 634, a third triangle 636, a fourth triangle 638) can be fitted within the virtual rectangle 682, as shown in the example scenario 680. At least a respective portion of each of the four triangles can form a respective corner of the virtual rectangle 682.

In an embodiment, the virtual rectangle 682 can be transmitted for presentation. A pyramidal representation of the spherical media content item can be enabled to be presented. Many variations are possible.

Figure 6F:
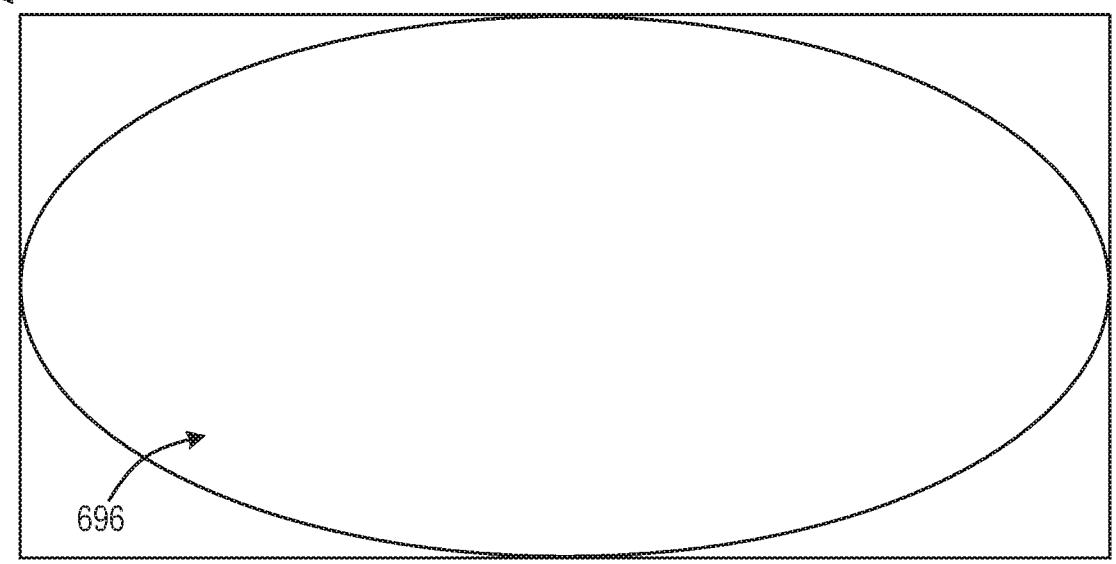
FIG. 6F illustrates an example scenario associated with mapping spherical media to a three dimensional geometrical object with a converged point, according to an embodiment of the present disclosure.

FIG. 6F illustrates an example scenario 690 associated with mapping spherical media to a three dimensional geometrical object with a converged point, according to an embodiment of the present disclosure. In this example scenario 690, the base 696 can be associated with an oval shape and the three dimensional geometrical object can be associated with a cone shape or a teardrop shape. As shown in FIG. 6F, the base 696 and the one or more object sides can be fitted into a virtual rectangle 692 for improved data efficiency (e.g., data transmission, data compression, etc.).

Again, it is contemplated that all examples herein are provided for illustrative purposes and that there can be many variations or other possibilities associated with the disclosed technology. As discussed above, various embodiments of the disclosed technology can acquire a spherical media content item. A three dimensional geometrical object including a base and one or more object sides connected to the base can be selected. The one or more object sides can extend backward and narrow progressively to a converged point. The spherical media content item can be mapped onto the three dimensional geometrical object. A front portion of the spherical media content item can be mapped onto at least a portion of the base. A back portion of the spherical media content item can be mapped onto at least a portion of the one or more object sides. In an embodiment, the three dimensional geometrical object can be associated with at least one of a pyramid shape, a cone shape, or a teardrop shape.

In an embodiment, the base can be associated with at least one of a rectangular shape, a diamond shape, a circular shape, an oval shape, or a spherical portion shape.

In an embodiment, a respective set of two edges included with each of the four triangles can be expanded outward. The two edges can be nonadjacent to the base. The back portion of the spherical media content item can be mapped onto at least a portion of the each of the four triangles including the respective set of two edges.

FIG. 7 illustrates an example method 700 for presenting content, according to an embodiment of the present disclosure. It should be appreciated that there can be additional, fewer, or alternative steps performed in similar or alternative orders, or in parallel, within the scope of the various embodiments discussed herein unless otherwise stated.

At block 702, at least one content item to be presented is determined, the content item being composed using a set of content streams that capture at least one scene from a plurality of different positions. At block 704, a viewport interface for presenting the content item is determined, wherein the viewport interface is associated with a viewport shape. At block 706, the viewport interface is provided through a display, wherein at least one content stream is presented through the viewport interface, and wherein a portion of the content stream that corresponds to a region inside of the viewport shape is presented at a first content quality.

Figure 8:
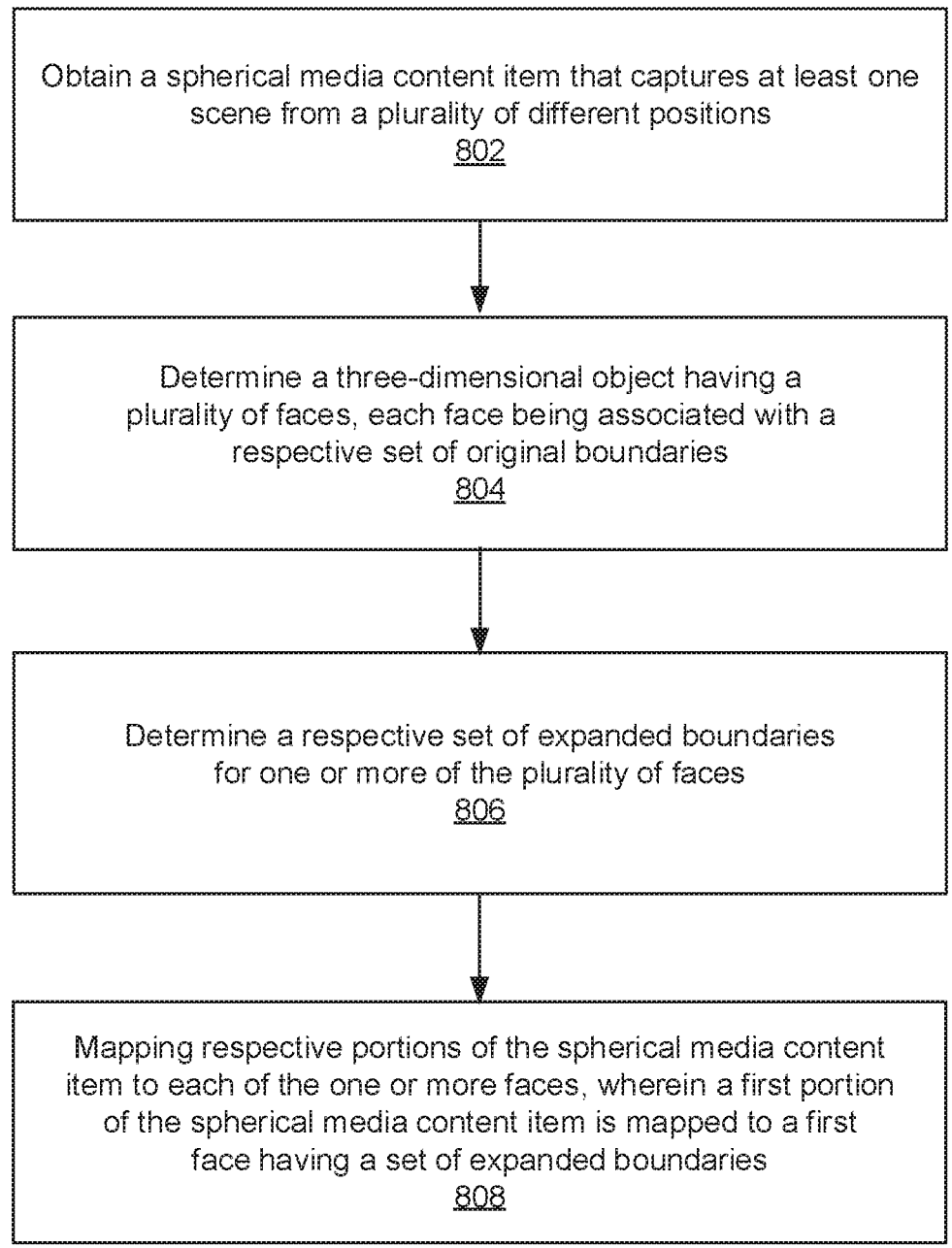
FIG. 8 illustrates another example method for presenting content, according to an embodiment of the present disclosure.

FIG. 8 illustrates an example method 800 for presenting content, according to an embodiment of the present disclosure. It should be appreciated that there can be additional, fewer, or alternative steps performed in similar or alternative orders, or in parallel, within the scope of the various embodiments discussed herein unless otherwise stated.

At block 802, a spherical media content item that captures at least one scene from a plurality of different positions is obtained. At block 804, a three-dimensional object having a plurality of faces is determined, each face being associated with a respective set of original boundaries. At block 806, a respective set of expanded boundaries for one or more of the plurality of faces is determined. At block 808, respective portions of the spherical media content item are mapped to each of the one or more faces, wherein a first portion of the spherical media content item is mapped to a first face having a set of expanded boundaries.

Figure 9:
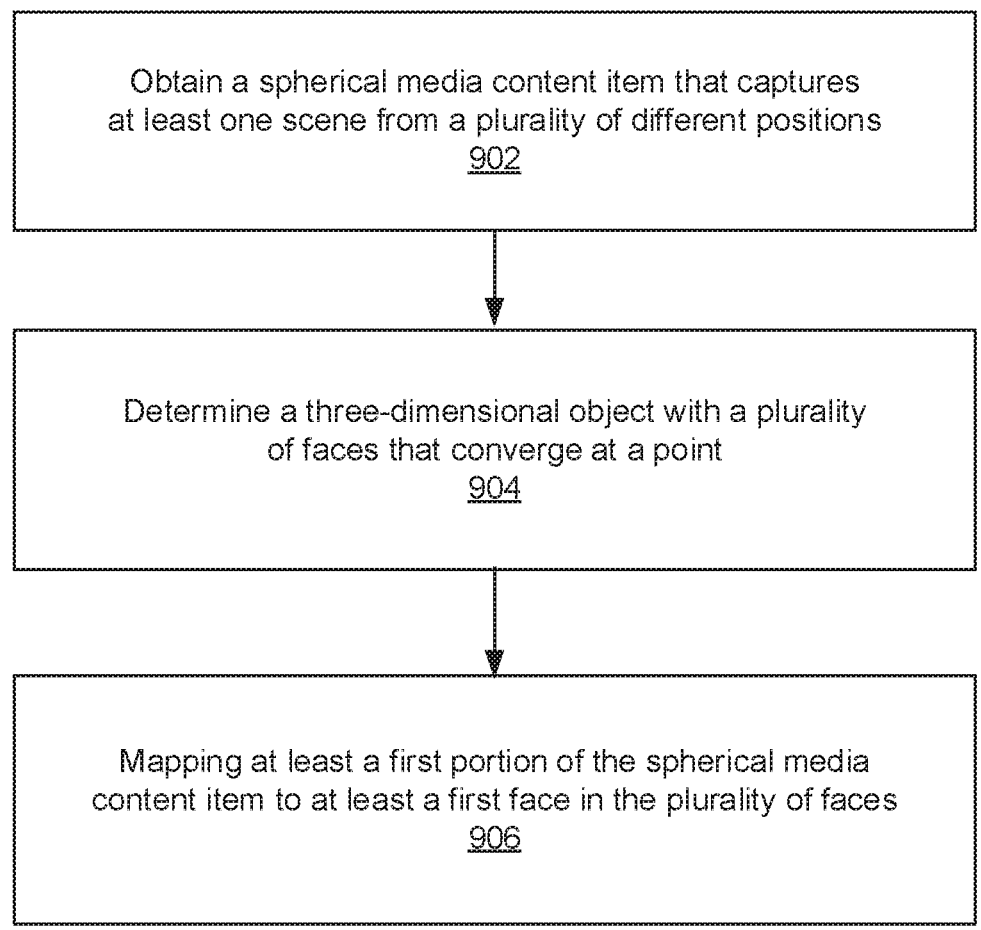
FIG. 9 illustrates yet another example method for presenting content, according to an embodiment of the present disclosure.

FIG. 9 illustrates an example method 900 for presenting content, according to an embodiment of the present disclosure. It should be appreciated that there can be additional, fewer, or alternative steps performed in similar or alternative orders, or in parallel, within the scope of the various embodiments discussed herein unless otherwise stated.

At block 902, a spherical media content item that captures at least one scene from a plurality of different positions is obtained. At block 904, a three-dimensional object with a plurality of faces that converge at a point is determined. At block 906, at least a first portion of the spherical media content item is mapped to at least a first face in the plurality of faces.

It is contemplated that there can be many other uses, applications, features, possibilities, and/or variations associated with the various embodiments of the present disclosure. In one example, the users can, in some cases, choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time (e.g., using machine learning or other statistical techniques).

Social Networking System—Example Implementation

Figure 10:
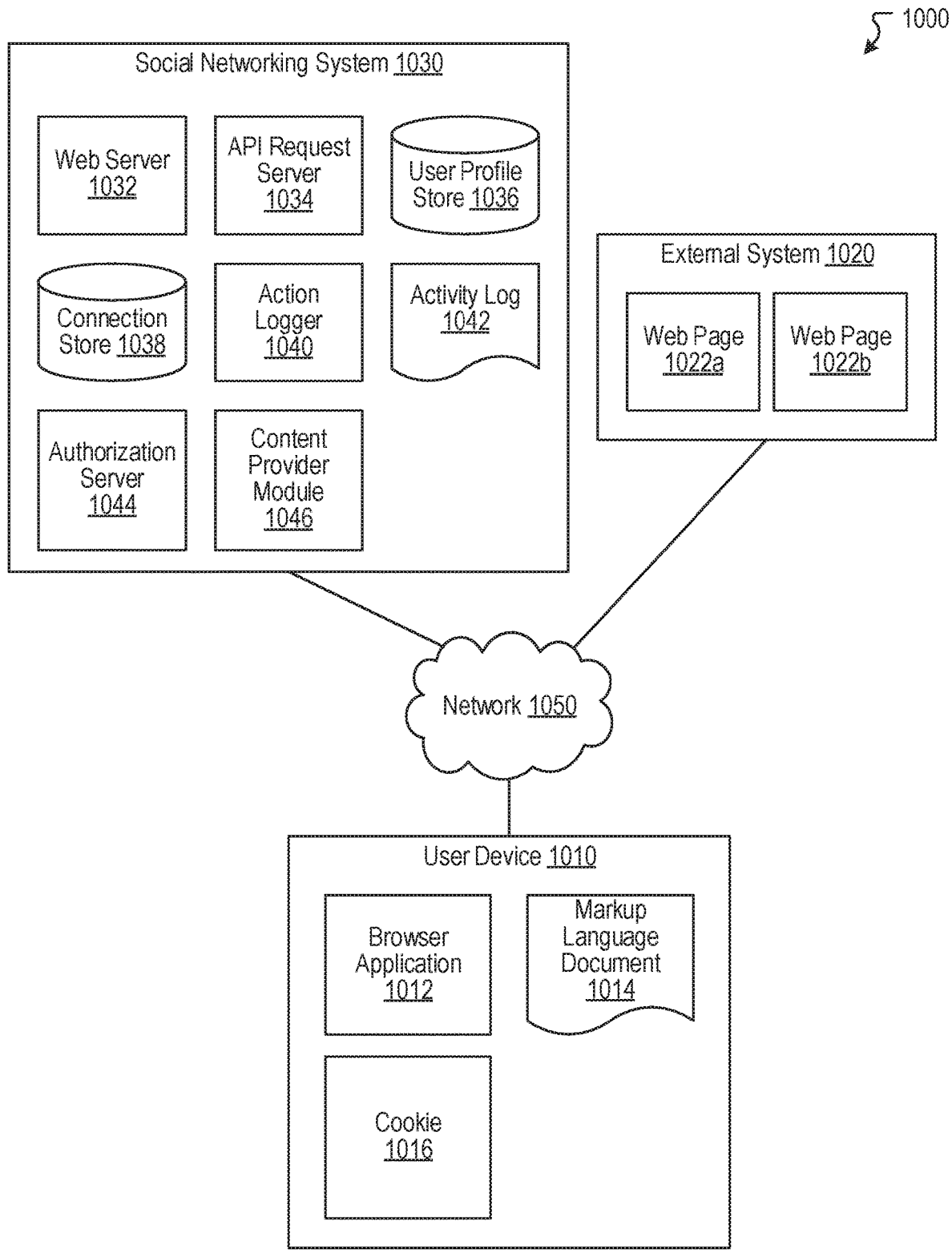
FIG. 10 illustrates a network diagram of an example system including an example social networking system that can be utilized in various scenarios, according to an embodiment of the present disclosure.

FIG. 10 illustrates a network diagram of an example system 1000 that can be utilized in various scenarios, in accordance with an embodiment of the present disclosure. The system 1000 includes one or more user devices 1010, one or more external systems 1020, a social networking system (or service) 1030, and a network 1050. In an embodiment, the social networking service, provider, and/or system discussed in connection with the embodiments described above may be implemented as the social networking system 1030. For purposes of illustration, the embodiment of the system 1000, shown by FIG. 10, includes a single external system 1020 and a single user device 1010. However, in other embodiments, the system 1000 may include more user devices 1010 and/or more external systems 1020. In certain embodiments, the social networking system 1030 is operated by a social network provider, whereas the external systems 1020 are separate from the social networking system 1030 in that they may be operated by different entities. In various embodiments, however, the social networking system 1030 and the external systems 1020 operate in conjunction to provide social networking services to users (or members) of the social networking system 1030. In this sense, the social networking system 1030 provides a platform or backbone, which other systems, such as external systems 1020, may use to provide social networking services and functionalities to users across the Internet. In some embodiments, the social networking system 1030 can include or correspond to a social media system (or service).

The user device 1010 comprises one or more computing devices (or systems) that can receive input from a user and transmit and receive data via the network 1050. In one embodiment, the user device 1010 is a conventional computer system executing, for example, a Microsoft Windows compatible operating system (OS), Apple OS X, and/or a Linux distribution. In another embodiment, the user device 1010 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 1010 is configured to communicate via the network 1050. The user device 1010 can execute an application, for example, a browser application that allows a user of the user device 1010 to interact with the social networking system 1030. In another embodiment, the user device 1010 interacts with the social networking system 1030 through an application programming interface (API) provided by the native operating system of the user device 1010, such as iOS and ANDROID. The user device 1010 is configured to communicate with the external system 1020 and the social networking system 1030 via the network 1050, which may comprise any combination of local area and/or wide area networks, using wired and/or wireless communication systems.

In one embodiment, the network 1050 uses standard communications technologies and protocols. Thus, the network 1050 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 1050 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 1050 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 1010 may display content from the external system 1020 and/or from the social networking system 1030 by processing a markup language document 1014 received from the external system 1020 and from the social networking system 1030 using a browser application 1012. The markup language document 1014 identifies content and one or more instructions describing formatting or presentation of the content. By executing the instructions included in the markup language document 1014, the browser application 1012 displays the identified content using the format or presentation described by the markup language document 1014. For example, the markup language document 1014 includes instructions for generating and displaying a web page having multiple frames that include text and/or image data retrieved from the external system 1020 and the social networking system 1030. In various embodiments, the markup language document 1014 comprises a data file including extensible markup language (XML) data, extensible hypertext markup language (XHTML) data, or other markup language data. Additionally, the markup language document 1014 may include JavaScript Object Notation (JSON) data, JSON with padding (JSONP), and JavaScript data to facilitate data-interchange between the external system 1020 and the user device 1010. The browser application 1012 on the user device 1010 may use a JavaScript compiler to decode the markup language document 1014.

The markup language document 1014 may also include, or link to, applications or application frameworks such as FLASH™ or Unity™ applications, the Silverlight™ application framework, etc.

In one embodiment, the user device 1010 also includes one or more cookies 1016 including data indicating whether a user of the user device 1010 is logged into the social networking system 1030, which may enable modification of the data communicated from the social networking system 1030 to the user device 1010.

The external system 1020 includes one or more web servers that include one or more web pages 1022*a*, 1022*b*, which are communicated to the user device 1010 using the network 1050. The external system 1020 is separate from the social networking system 1030. For example, the external system 1020 is associated with a first domain, while the social networking system 1030 is associated with a separate social networking domain. Web pages 1022*a*, 1022*b*, included in the external system 1020, comprise markup language documents 1014 identifying content and including instructions specifying formatting or presentation of the identified content.

The social networking system 1030 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 1030 may be administered, managed, or controlled by an operator. The operator of the social networking system 1030 may be a human being, an automated application, or a series of applications for managing content, regulating policies, and collecting usage metrics within the social networking system 1030. Any type of operator may be used.

Users may join the social networking system 1030 and then add connections to any number of other users of the social networking system 1030 to whom they desire to be connected. As used herein, the term "friend" refers to any other user of the social networking system 1030 to whom a user has formed a connection, association, or relationship via the social networking system 1030. For example, in an embodiment, if users in the social networking system 1030 are represented as nodes in the social graph, the term "friend" can refer to an edge formed between and directly connecting two user nodes.

Connections may be added explicitly by a user or may be automatically created by the social networking system 1030 based on common characteristics of the users (e.g., users who are alumni of the same educational institution). For example, a first user specifically selects a particular other user to be a friend. Connections in the social networking system 1030 are usually in both directions, but need not be, so the terms "user" and "friend" depend on the frame of reference. Connections between users of the social networking system 1030 are usually bilateral ("two-way"), or "mutual," but connections may also be unilateral, or "one-way." For example, if Bob and Joe are both users of the social networking system 1030 and connected to each other, Bob and Joe are each other's connections. If, on the other hand, Bob wishes to connect to Joe to view data communicated to the social networking system 1030 by Joe, but Joe does not wish to form a mutual connection, a unilateral connection may be established. The connection between users may be a direct connection; however, some embodiments of the social networking system 1030 allow the connection to be indirect via one or more levels of connections or degrees of separation.

In addition to establishing and maintaining connections between users and allowing interactions between users, the social networking system 1030 provides users with the ability to take actions on various types of items supported by the social networking system 1030. These items may include groups or networks (i.e., social networks of people, entities, and concepts) to which users of the social networking system 1030 may belong, events or calendar entries in which a user might be interested, computer-based applications that a user may use via the social networking system 1030, transactions that allow users to buy or sell items via services provided by or through the social networking system 1030, and interactions with advertisements that a user may perform on or off the social networking system 1030. These are just a few examples of the items upon which a user may act on the social networking system 1030, and many others are possible. A user may interact with anything that is capable of being represented in the social networking system 1030 or in the external system 1020, separate from the social networking system 1030, or coupled to the social networking system 1030 via the network 1050.

The social networking system 1030 is also capable of linking a variety of entities. For example, the social networking system 1030 enables users to interact with each other as well as external systems 1020 or other entities through an API, a web service, or other communication channels. The social networking system 1030 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 1030. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 1030 modifies edges connecting the various nodes to reflect the relationships and interactions.

The social networking system 1030 also includes user-generated content, which enhances a user's interactions with the social networking system 1030. User-generated content may include anything a user can add, upload, send, or "post" to the social networking system 1030. For example, a user communicates posts to the social networking system 1030 from a user device 1010. Posts may include data such as status updates or other textual data, location information, images such as photos, videos, links, music or other similar data and/or media. Content may also be added to the social networking system 1030 by a third party. Content "items" are represented as objects in the social networking system 1030. In this way, users of the social networking system 1030 are encouraged to communicate with each other by posting text and content items of various types of media through various communication channels. Such communication increases the interaction of users with each other and increases the frequency with which users interact with the social networking system 1030.

The social networking system 1030 includes a web server 1032, an API request server 1034, a user profile store 1036, a connection store 1038, an action logger 1040, an activity log 1042, and an authorization server 1044. In an embodiment of the invention, the social networking system 1030 may include additional, fewer, or different components for various applications. Other components, such as network interfaces, security mechanisms, load balancers, failover servers, management and network operations consoles, and the like are not shown so as to not obscure the details of the system.

The user profile store 1036 maintains information about user accounts, including biographic, demographic, and other types of descriptive information, such as work experience, educational history, hobbies or preferences, location, and the like that has been declared by users or inferred by the social networking system 1030. This information is stored in the user profile store 1036 such that each user is uniquely identified. The social networking system 1030 also stores data describing one or more connections between different users in the connection store 1038. The connection information may indicate users who have similar or common work experience, group memberships, hobbies, or educational history. Additionally, the social networking system 1030 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 1030, such as non-person entities, buckets, cluster centers, images, interests, pages, external systems, concepts, and the like are also stored in the connection store 1038.

The social networking system 1030 maintains data about objects with which a user may interact. To maintain this data, the user profile store 1036 and the connection store 1038 store instances of the corresponding type of objects maintained by the social networking system 1030. Each object type has information fields that are suitable for storing information appropriate to the type of object. For example, the user profile store 1036 contains data structures with fields suitable for describing a user's account and information related to a user's account. When a new object of a particular type is created, the social networking system 1030 initializes a new data structure of the corresponding type, assigns a unique object identifier to it, and begins to add data to the object as needed. This might occur, for example, when a user becomes a user of the social networking system 1030, the social networking system 1030 generates a new instance of a user profile in the user profile store 1036, assigns a unique identifier to the user account, and begins to populate the fields of the user account with information provided by the user.

The connection store 1038 includes data structures suitable for describing a user's connections to other users, connections to external systems 1020 or connections to other entities. The connection store 1038 may also associate a connection type with a user's connections, which may be used in conjunction with the user's privacy setting to regulate access to information about the user. In an embodiment of the invention, the user profile store 1036 and the connection store 1038 may be implemented as a federated database.

Data stored in the connection store 1038, the user profile store 1036, and the activity log 1042 enables the social networking system 1030 to generate the social graph that uses nodes to identify various objects and edges connecting nodes to identify relationships between different objects. For example, if a first user establishes a connection with a second user in the social networking system 1030, user accounts of the first user and the second user from the user profile store 1036 may act as nodes in the social graph. The connection between the first user and the second user stored by the connection store 1038 is an edge between the nodes associated with the first user and the second user. Continuing this example, the second user may then send the first user a message within the social networking system 1030. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 1030 (or, alternatively, in an image maintained by another system outside of the social networking system 1030). The image may itself be represented as a node in the social networking system 1030. This tagging action may create edges between the first user and the second user as well as create an edge between each of the users and the image, which is also a node in the social graph. In yet another example, if a user confirms attending an event, the user and the event are nodes obtained from the user profile store 1036, where the attendance of the event is an edge between the nodes that may be retrieved from the activity log 1042. By generating and maintaining the social graph, the social networking system 1030 includes data describing many different types of objects and the interactions and connections among those objects, providing a rich source of socially relevant information.

The web server 1032 links the social networking system 1030 to one or more user devices 1010 and/or one or more external systems 1020 via the network 1050. The web server 1032 serves web pages, as well as other web-related content, such as Java, JavaScript, Flash, XML, and so forth. The web server 1032 may include a mail server or other messaging functionality for receiving and routing messages between the social networking system 1030 and one or more user devices 1010. The messages can be instant messages, queued messages (e.g., email), text and SMS messages, or any other suitable messaging format.

The API request server 1034 allows one or more external systems 1020 and user devices 1010 to call access information from the social networking system 1030 by calling one or more API functions. The API request server 1034 may also allow external systems 1020 to send information to the social networking system 1030 by calling APIs. The external system 1020, in one embodiment, sends an API request to the social networking system 1030 via the network 1050, and the API request server 1034 receives the API request. The API request server 1034 processes the request by calling an API associated with the API request to generate an appropriate response, which the API request server 1034 communicates to the external system 1020 via the network 1050. For example, responsive to an API request, the API request server 1034 collects data associated with a user, such as the user's connections that have logged into the external system 1020, and communicates the collected data to the external system 1020. In another embodiment, the user device 1010 communicates with the social networking system 1030 via APIs in the same manner as external systems 1020.

The action logger 1040 is capable of receiving communications from the web server 1032 about user actions on and/or off the social networking system 1030. The action logger 1040 populates the activity log 1042 with information about user actions, enabling the social networking system 1030 to discover various actions taken by its users within the social networking system 1030 and outside of the social networking system 1030. Any action that a particular user takes with respect to another node on the social networking system 1030 may be associated with each user's account, through information maintained in the activity log 1042 or in a similar database or other data repository. Examples of actions taken by a user within the social networking system 1030 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 1030, the action is recorded in the activity log 1042. In one embodiment, the social networking system 1030 maintains the activity log 1042 as a database of entries. When an action is taken within the social networking system 1030, an entry for the action is added to the activity log 1042. The activity log 1042 may be referred to as an action log.

Additionally, user actions may be associated with concepts and actions that occur within an entity outside of the social networking system 1030, such as an external system 1020 that is separate from the social networking system 1030. For example, the action logger 1040 may receive data describing a user's interaction with an external system 1020 from the web server 1032. In this example, the external system 1020 reports a user's interaction according to structured actions and objects in the social graph.

Other examples of actions where a user interacts with an external system 1020 include a user expressing an interest in an external system 1020 or another entity, a user posting a comment to the social networking system 1030 that discusses an external system 1020 or a web page 1022*a* within the external system 1020, a user posting to the social networking system 1030 a Uniform Resource Locator (URL) or other identifier associated with an external system 1020, a user attending an event associated with an external system 1020, or any other action by a user that is related to an external system 1020. Thus, the activity log 1042 may include actions describing interactions between a user of the social networking system 1030 and an external system 1020 that is separate from the social networking system 1030.

The authorization server 1044 enforces one or more privacy settings of the users of the social networking system 1030. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 1020, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 1020. One embodiment allows the specification of the set of entities to comprise an enumeration of entities. For example, the user may provide a list of external systems 1020 that are allowed to access certain information. Another embodiment allows the specification to comprise a set of entities along with exceptions that are not allowed to access the information. For example, a user may allow all external systems 1020 to access the user's work information, but specify a list of external systems 1020 that are not allowed to access the work information. Certain embodiments call the list of exceptions that are not allowed to access certain information a "block list". External systems 1020 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 1044 contains logic to determine if certain information associated with a user can be accessed by a user's friends, external systems 1020, and/or other applications and entities. The external system 1020 may need authorization from the authorization server 1044 to access the user's more private and sensitive information, such as the user's work phone number. Based on the user's privacy settings, the authorization server 1044 determines if another user, the external system 1020, an application, or another entity is allowed to access information associated with the user, including information about actions taken by the user.

Various embodiments of the disclosed technology, such as those discussed in reference to FIG. 1A through FIG. 9, can be implemented as, included in, and/or operable with the social networking system 1030 (e.g., the content provider module 1046) and/or the user device 1010. It should be appreciated that there can be many variations or other possibilities associated with the disclosed technology.

Hardware Implementation

Figure 11:
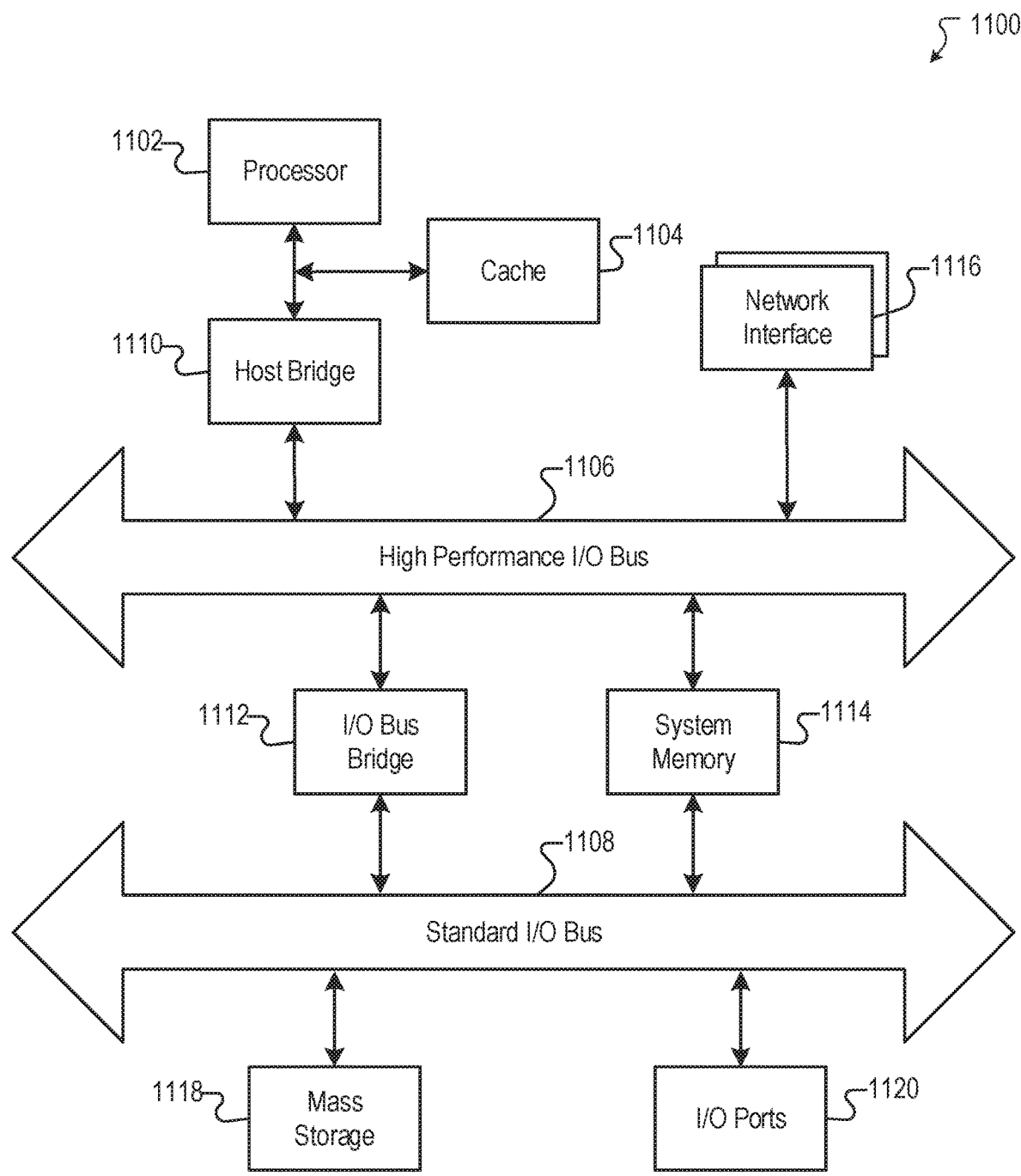
FIG. 11 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 11 illustrates an example of a computer system 1100 that may be used to implement one or more of the embodiments described herein in accordance with an embodiment of the invention. The computer system 1100 includes sets of instructions for causing the computer system 1100 to perform the processes and features discussed herein. The computer system 1100 may be connected (e.g., networked) to other machines. In a networked deployment, the computer system 1100 may operate in the capacity of a server machine or a client machine in a client-server network environment, or as a peer machine in a peer-to-peer (or distributed) network environment. In an embodiment of the invention, the computer system 1100 may be the social networking system 1030, the user device 1010, and the external system 1120, or a component thereof. In an embodiment of the invention, the computer system 1100 may be one server among many that constitutes all or part of the social networking system 1030.

The computer system 1100 includes a processor 1102, a cache 1104, and one or more executable modules and drivers, stored on a computer-readable medium, directed to the processes and features described herein. Additionally, the computer system 1100 includes a high performance input/output (I/O) bus 1106 and a standard I/O bus 1108. A host bridge 1110 couples processor 1102 to high performance I/O bus 1106, whereas I/O bus bridge 1112 couples the two buses 1106 and 1108 to each other. A system memory 1114 and one or more network interfaces 1116 couple to high performance I/O bus 1106. The computer system 1100 may further include video memory and a display device coupled to the video memory (not shown). Mass storage 1118 and I/O ports 1120 couple to the standard I/O bus 1108. The computer system 1100 may optionally include a keyboard and pointing device, a display device, or other input/output devices (not shown) coupled to the standard I/O bus 1108. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1100 are described in greater detail below. In particular, the network interface 1116 provides communication between the computer system 1100 and any of a wide range of networks, such as an Ethernet (e.g., IEEE 802.3) network, a backplane, etc. The mass storage 1118 provides permanent storage for the data and programming instructions to perform the above-described processes and features implemented by the respective computing systems identified above, whereas the system memory 1114 (e.g., DRAM) provides temporary storage for the data and programming instructions when executed by the processor 1102. The I/O ports 1120 may be one or more serial and/or parallel communication ports that provide communication between additional peripheral devices, which may be coupled to the computer system 1100.

The computer system 1100 may include a variety of system architectures, and various components of the computer system 1100 may be rearranged. For example, the cache 1104 may be on-chip with processor 1102. Alternatively, the cache 1104 and the processor 1102 may be packed together as a "processor module", with processor 1102 being referred to as the "processor core". Furthermore, certain embodiments of the invention may neither require nor include all of the above components. For example, peripheral devices coupled to the standard I/O bus 1108 may couple to the high performance I/O bus 1106. In addition, in some embodiments, only a single bus may exist, with the components of the computer system 1100 being coupled to the single bus. Moreover, the computer system 1100 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1100 that, when read and executed by one or more processors, cause the computer system 1100 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1100, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1102. Initially, the series of instructions may be stored on a storage device, such as the mass storage 1118. However, the series of instructions can be stored on any suitable computer readable storage medium. Furthermore, the series of instructions need not be stored locally, and could be received from a remote storage device, such as a server on a network, via the network interface 1116. The instructions are copied from the storage device, such as the mass storage 1118, into the system memory 1114 and then accessed and executed by the processor 1102. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1100 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing device, a viewport interface for accessing a content item, the content item being composed using a set of content streams that capture at least one scene from a plurality of different positions;
   predicting, by the computing device, at least one change in a direction of the viewport interface while accessing the content item, wherein the predicted change in the direction corresponds to a second viewport interface for accessing at least one different content stream of the content item, the predicting further comprising:
      determining, by the computing device, the change in the direction to correspond to the second viewport interface for accessing the at least one different content stream based at least in part on aggregated user data indicating playback times at which viewport interfaces of different users transitioned to the at least one different content stream while accessing the content item; and
   buffering, by the computing device, the at least one different content stream corresponding to the second viewport interface prior to the viewport interface transitioning to the second viewport interface.

2. The computer-implemented method of claim 1, wherein the viewport interface presents one or more content streams from the set of content streams, the one or more content streams being determined based at least in part on the direction of the viewport interface.

3. The computer-implemented method of claim 1, wherein the at least one change in the direction is predicted based at least in part on aggregated user viewing patterns associated with the content item.

4. The computer-implemented method of claim 1, wherein the at least one change in the direction is predicted based at least in part on aggregated user data that measures one or more changes to respective directions of user viewport interfaces while accessing the content item.

5. The computer-implemented method of claim 4, wherein the aggregated user data indicates at least one playback time at which a viewport interface of a given user transitioned from a first direction to a second direction.

6. The computer-implemented method of claim 1, wherein the prediction is based at least in part on a probability transition map that provides respective likelihoods of a direction of a viewport interface transitioning from a first direction to a second direction at a given playback time.

7. The computer-implemented method of claim 6, wherein the probability transition map is implemented as a Markov model.

8. The computer-implemented method of claim 1, wherein the computing device is a mobile device or virtual reality apparatus.

9. The computer-implemented method of claim 1, wherein the plurality of content streams collectively capture a 360-degree view of the at least one scene.

10. A system comprising:
at least one processor; and
a memory storing instructions that, when executed by the at least one processor, cause the system to perform:
determining a viewport interface for accessing a content item, the content item being composed using a set of content streams that capture at least one scene from a plurality of different positions;
predicting at least one change in a direction of the viewport interface while accessing the content item, wherein the predicted change in the direction corresponds to a second viewport interface for accessing at least one different content stream of the content item, the predicting further comprising:
determining the change in the direction to correspond to the second viewport interface for accessing the at least one different content stream based at least in part on aggregated user data indicating playback times at which viewport interfaces of different users transitioned to the at least one different content stream while accessing the content item; and
buffering the at least one different content stream corresponding to the second viewport interface prior to the viewport interface transitioning to the second viewport interface.

11. The system of claim 10, wherein the viewport interface presents one or more content streams from the set of content streams, the one or more content streams being determined based at least in part on the direction of the viewport interface.

12. The system of claim 10, wherein the at least one change in the direction is predicted based at least in part on aggregated user viewing patterns associated with the content item.

13. The system of claim 10, wherein the at least one change in the direction is predicted based at least in part on aggregated user data that measures one or more changes to respective directions of user viewport interfaces while accessing the content item.

14. The system of claim 13, wherein the aggregated user data indicates at least one playback time at which a viewport interface of a given user transitioned from a first direction to a second direction.

15. A non-transitory computer-readable storage medium including instructions that, when executed by at least one processor of a computing system, cause the computing system to perform:
determining a viewport interface for accessing a content item, the content item being composed using a set of content streams that capture at least one scene from a plurality of different positions;
predicting at least one change in a direction of the viewport interface while accessing the content item, wherein the predicted change in the direction corresponds to a second viewport interface for accessing at least one different content stream of the content item, the predicting further comprising:
determining the change in the direction to correspond to the second viewport interface for accessing the at least one different content stream based at least in part on aggregated user data indicating playback times at which viewport interfaces of different users transitioned to the at least one different content stream while accessing the content item; and
buffering the at least one different content stream corresponding to the second viewport interface prior to the viewport interface transitioning to the second viewport interface.

16. The non-transitory computer-readable storage medium of claim 15, wherein the viewport interface presents one or more content streams from the set of content streams, the one or more content streams being determined based at least in part on the direction of the viewport interface.

17. The non-transitory computer-readable storage medium of claim 15, wherein the at least one change in the direction is predicted based at least in part on aggregated user viewing patterns associated with the content item.

18. The non-transitory computer-readable storage medium of claim 15, wherein the at least one change in the direction is predicted based at least in part on aggregated user data that measures one or more changes to respective directions of user viewport interfaces while accessing the content item.

19. The non-transitory computer-readable storage medium of claim 18, wherein the aggregated user data indicates at least one playback time at which a viewport interface of a given user transitioned from a first direction to a second direction.

* * * * *